US011856527B2

United States Patent
Bergljung et al.

(10) Patent No.: US 11,856,527 B2
(45) Date of Patent: Dec. 26, 2023

(54) POWER HEADROOM REPORT (PHR) REPORTING DETERMINATION

(71) Applicant: Telefonaktiebolaget LM Ericsson (publ), Stockholm (SE)

(72) Inventors: Christian Bergljung, Lund (SE); Daniel Chen Larsson, Lund (SE); Havish Koorapaty, Saratoga, CA (US); Ravikiran Nory, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 459 days.

(21) Appl. No.: 17/265,917

(22) PCT Filed: Aug. 8, 2019

(86) PCT No.: PCT/SE2019/050731
§ 371 (c)(1),
(2) Date: Feb. 4, 2021

(87) PCT Pub. No.: WO2020/032866
PCT Pub. Date: Feb. 13, 2020

(65) Prior Publication Data
US 2021/0204227 A1 Jul. 1, 2021

Related U.S. Application Data

(60) Provisional application No. 62/717,613, filed on Aug. 10, 2018.

(51) Int. Cl.
*H04W 52/34* (2009.01)
*H04W 76/15* (2018.01)
(Continued)

(52) U.S. Cl.
CPC ......... *H04W 52/34* (2013.01); *H04W 52/365* (2013.01); *H04W 52/367* (2013.01); *H04W 52/38* (2013.01); *H04W 76/15* (2018.02)

(58) Field of Classification Search
CPC ... H04W 52/34; H04W 76/15; H04W 52/365; H04W 52/367; H04W 52/38
See application file for complete search history.

(56) References Cited

U.S. PATENT DOCUMENTS

2019/0037560 A1* 1/2019 Huang ................. H04W 24/10

FOREIGN PATENT DOCUMENTS

EP 2854460 A1 4/2015

OTHER PUBLICATIONS

International Search Report and Written Opinion dated Oct. 28, 2019 for International Application No. PCT/SE2019/050731 filed on Aug. 2, 2019, consisting of 12-pages.
(Continued)

*Primary Examiner* — Gerald Johnson
(74) *Attorney, Agent, or Firm* — Christopher & Weisberg, P. A.

(57) ABSTRACT

Methods and apparatuses are disclosed for power headroom report (PHR) reporting determination for dual-connectivity. In one embodiment, a method in a wireless device is provided including operating in dual-connectivity with at least two different radio access technologies, RATs, the at least two different RATs including at least a first RAT and a second RAT; determining a first power headroom report, PHR, for the first RAT based at least in part on a WD transmission using the first RAT; determining a second PHR for the second RAT based at least in part on both the WD transmission using the first RAT and the WD transmission using the second RAT; and transmitting based on a received allocation information, the allocation information based at least in part on at least one of the determined first PHR and the determined second PHR.

18 Claims, 10 Drawing Sheets

(51) Int. Cl.
    *H04W 52/36*     (2009.01)
    *H04W 52/38*     (2009.01)

(56)           References Cited

OTHER PUBLICATIONS

3GPP TSG-RAN WG2 #99bis R2-1711799; Title: NSA PHR for EN-DC; Agenda Item: 10.3.1.12; Source: Samsung; Document for: Discussion and Decision; Date and Location: Oct. 9-13, 2017, Prague, Czech Republic, consisting of 3-pages.
3GPP TSG-RAN WG1 NR Ad-hoc#2 R1-1711526; Title: Power Sharing for LTE-NR Dual connectivity; Agenda Item: 5.1.9.1; Source: Ericsson; Document for: Discussion and Decision; Date and Location: Jun. 27-30, 2017, Qingdao, China, consisting of 3-pages.
3GPP TSG-RAN WG2 Meeting #100; Title: PConsideration on PHR for EN-DC; Agenda Item: 10.2.2.3; Source: Huawei, HiSilicon; Document for: Discussion and Decision; Date and Location: Nov. 25-Dec. 1, 2017, Reno, Nevada, USA, consisting of 3-pages.
3GPP TS 38.213 V15.2.0; 3rd Generation Partnership Project; Technical Specification Group Radio Access Network; NR; Physical layer procedures for control (Release 15); Jun. 2018, consisting of 99-pages.
3GPP TS 38.101-1 V15.8.2; 3rd Generation Partnership Project; Technical Specification Group Radio Access Network; NR; User Equipment (UE) radio transmission and reception; Part 1: Range 1 Standalone (Release 15); Dec. 2019, consisting of 236-pages.
3GPP TS 38.101-2 V15.8.0; 3rd Generation Partnership Project; Technical Specification Group Radio Access Network; NR; User Equipment (UE) radio transmission and reception; Part 2: Range 2 Standalone (Release 15); Dec. 2019, consisting of 144-pages.

* cited by examiner

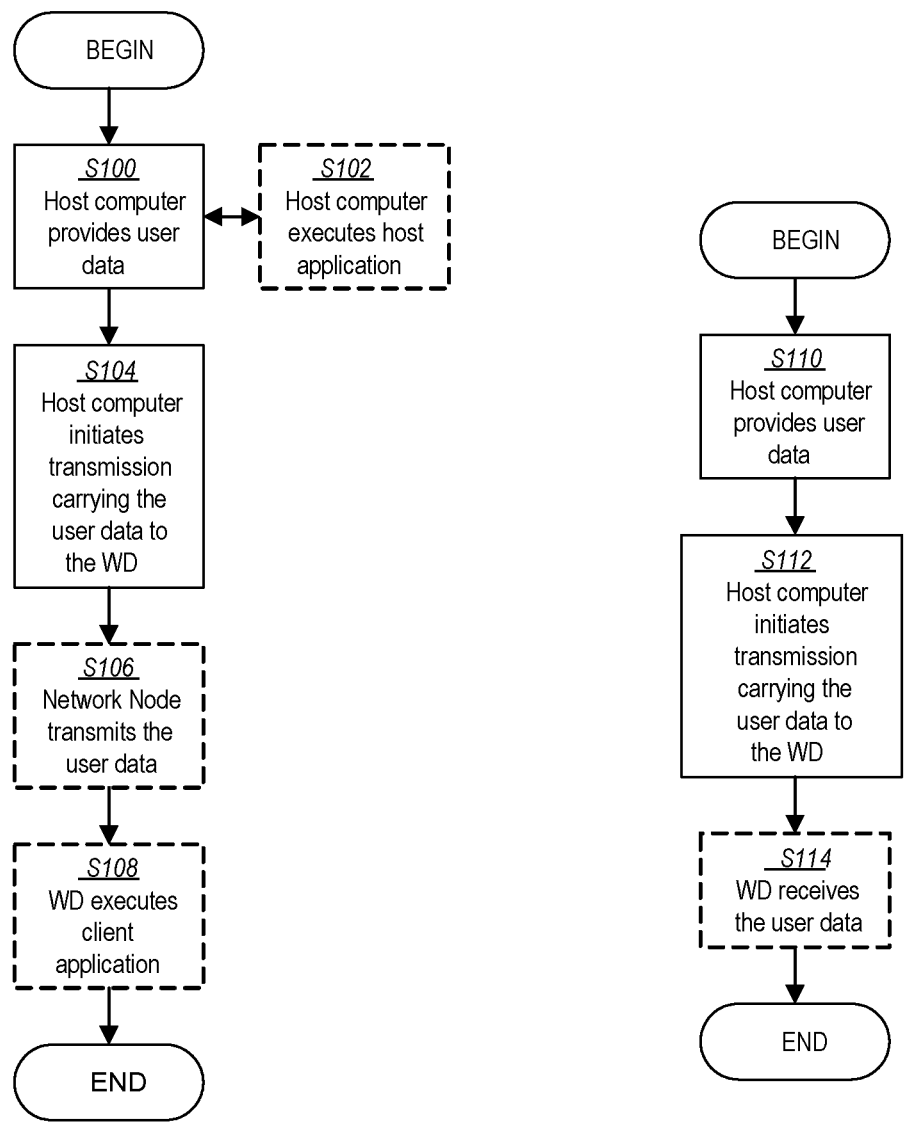

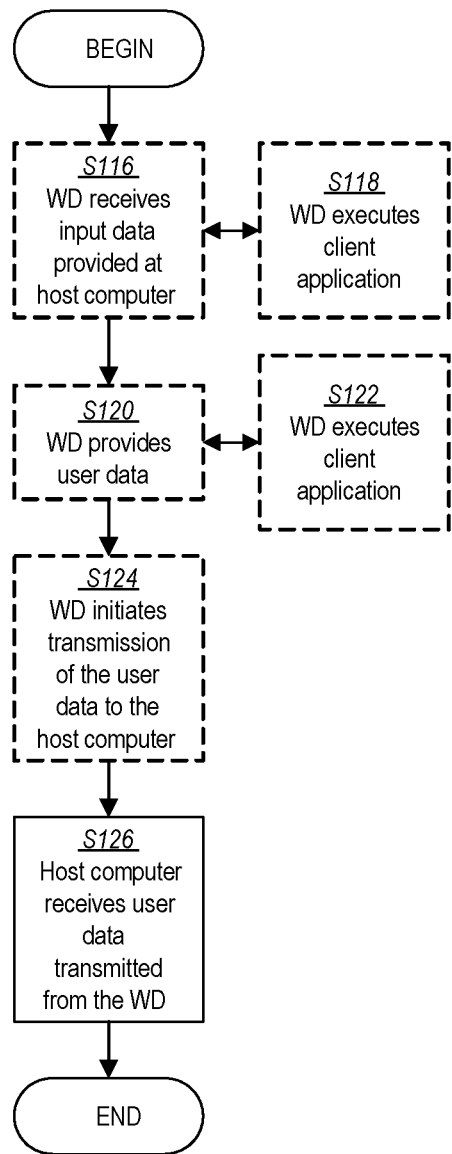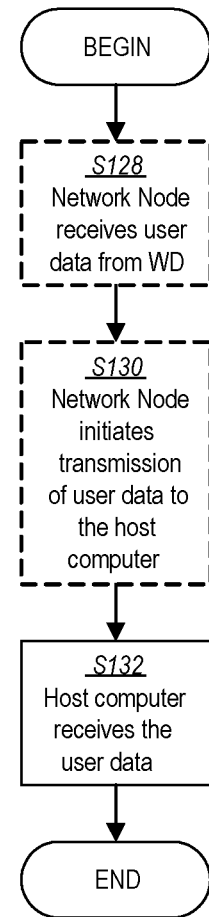
FIG. 5
FIG. 6

POWER HEADROOM REPORT (PHR) REPORTING DETERMINATION

CROSS-REFERENCE TO RELATED APPLICATIONS

This application is a Submission Under 35 U.S.C. § 371 for U.S. National Stage Patent Application of International Application No.: PCT/SE2019/050731, filed Aug. 2, 2019 entitled "POWER HEADROOM REPORT (PHR) REPORTING DETERMINATION," which claims priority to U.S. Provisional Application No. 62/717,613, filed Aug. 10, 2018, entitled the entireties of both of which are incorporated herein by reference.

TECHNICAL FIELD

Wireless communication and in particular, to Power Headroom Report (PHR) reporting determination for dual-connectivity (DC).

BACKGROUND

When a WD transmits physicals channels (such as Physical Uplink Shared Channel (PUSCH), Physical Uplink Control Channel (PUCCH), Physical Random Access Channel (PRACH), etc.) or signals (such as, a Sounding Reference Signal (SRS)), the maximum power level at which the WD makes those transmissions is generally bounded by a configured maximum transmit power (Pcmax) value.

For WD transmissions corresponding to multiple component carriers or serving cells (e.g., c1, c2, c3) in a carrier aggregation scenario, the WD transmissions corresponding to each serving cell are bounded by a per serving cell configured maximum transmit power value Pcmax,c (where c=c1, c2, c3), and the cumulative power of the transmissions across all the serving cells is bounded by a total configured maximum output power P_cmax. Pcmax,c used by the WD may be required to be within a particular range with the higher bound typically determined by the Power class declared (Ppowerclass) by the WD and any higher layer (e.g., Radio Resource Control (RRC)) configured power limits (P_emax,c) and the lower bound based on P_powerclass, p-emax, and maximum values of any power reductions that the WD can apply.

For example, WD transmissions corresponding to serving cell c are bounded by PCMAX,c that may be in the following range shown below:

PCMAX_L,c ≤ PCMAX,c ≤ PCMAX_H,c with

PCMAX_L,c = MIN {PEMAX,c, PPowerClass−MAX(X-MPR,c))}

PCMAX_H,c = MIN {PEMAX,c, PPowerClass} where

PCMAX_H,c is the higher bound on PCMAX,c;

PCMAX_L,c is the lower bound on PCMAX,c;

PEMAX,c is a higher layer (e.g., RRC) configured power limit;

PPowerClass is the WD power class and is a maximum WD power value that is present in specifications;

X-MPR,c is the sum of maximum values of power reductions (MPR) that the WD is allowed to take; and the above values are in dB scale.

For the case where the WD has transmissions corresponding to multiple component carriers or serving cells, the total configured maximum output power PCMAX1 may be required to be within the following bounds:

PCMAX_L ≤ PCMAX ≤ PCMAX_H

PCMAX_L = MIN{10 log 10ΣMIN[pEMAX,c,pPowerClass/(x-mpr,c)],PPowerClass}

PCMAX_H = MIN{10 log 10ΣpEMAX,c,PPowerClass} where pEMAX,c is the linear value of PEMAX, c;

PPowerClass is the WD power class and is a maximum WD power value that is present in specifications;

pPowerClass is the linear value of PPowerClass;

x-mpr,c is the linear value of X-MPR,c described above for each serving cell c; and the summation ($\Sigma()$) shown above is applied across all the serving cell (e.g. c1, c2, c3) on which the WD has transmissions.

There are corresponding PHR reporting procedures in 3rd Generation Partnership Project (3GPP) Technical Specification (TS) 38.213 V15.2.0.

Power Headroom Report

At least some of the types of WD power headroom reports are described as follows. A Type 1 WD power headroom PH that is valid for PUSCH transmission occasion i on UL Bandwidth Part (BWP) b of carrier f of serving cell c. A Type 3 WD power headroom PH that is valid for SRS transmission occasion i on UL BWP b of carrier f of serving cell.

A WD may determine whether a power headroom report for an activated serving cell is based on an actual transmission or a reference format by considering the downlink control information (DCI) the WD received until and including the PDCCH monitoring occasion. The PDCCH monitoring occasion is where the WD detects the first DCI format 0_0 or DCI format 0_1 scheduling an initial transmission of a transport block, as determined by the new data indicator field in DCI format 0_0 or DCI format 0_1, since a power headroom report was triggered.

If the WD is configured with a Secondary Cell Group (SCG),

For computing power headroom for cells belonging to the Master Cell Group (MCG), the term 'serving cell' may refer to serving cell belonging to the MCG.

For computing power headroom for cells belonging to SCG, the term 'serving cell' may refer to serving cell belonging to the SCG. The term 'primary cell' may refer to the Primary SCell (PSCell) of the SCG.

If the WD is configured with a PUCCH-SCell,

For computing power headroom for cells belonging to primary PUCCH group, the term 'serving cell' may refer to serving cell belonging to the primary PUCCH group.

For computing power headroom for cells belonging to secondary PUCCH group, the term 'serving cell' may refer to serving cell belonging to the secondary PUCCH group. The term 'primary cell' may refer to the PUCCH-SCell of the secondary PUCCH group.

Type 1 PH Report

If a WD determines that a Type 1 power headroom report for an activated serving cell is based on an actual PUSCH transmission then, for PUSCH transmission occasion i on active UL BWP b of carrier f of serving cell c, the WD computes the Type 1 power headroom report as $PH_{type1,b,f,c}(i,j,q_d,l) = P_{CMAX,f,c}(i) - \{P_{O\_PUSCH,b,f,c}(j) + 10 \log_{10}(2^{\mu} \cdot M_{RB,b,f,c}^{PUSCH}(i)) + \alpha_{b,f,c}(j)(q_d) + \Delta_{TF,b,f,c}(i) + [dB]$, where $P_{CMAX,f,c}$ $P_{O\_PUSCH,b,f,c}(j)$, $M_{RB,b,f,c}^{PUSCH}(i)$, $\alpha_{b,f,c}(j)$, $PL_{b,f,c}$ $(q_d)$, $\Delta_{TFb,f,c}(i)$ and $f_{b,f,c}(i,l)$ are defined in Subclause 7.1.1 of TS 38.213 V15.2.0.

If a WD is configured with multiple cells for PUSCH transmissions, where a subcarrier spacing configuration $\mu_1$ on active UL BWP $b_1$ of carrier $f_1$ of serving cell $c_1$ is smaller than a subcarrier spacing configuration $\mu_2$ on active UL BWP $b_2$ of carrier $f_2$ of serving cell $c_2$, and if the WD provides a Type 1 power headroom report in a PUSCH transmission in a slot on UL BWP $b_1$ that overlaps with multiple slots on UL BWP $b_2$, the WD provides a Type 1 power headroom report for the first slot of the multiple slots on UL BWP $b_2$ that fully overlaps with the slot on UL BWP b.

If a WD is configured with multiple cells for PUSCH transmissions, the WD does not consider for computation of a Type 1 power headroom report in a first PUSCH transmission that includes an initial transmission of transport block on active UL BWP $b_1$ of carrier $f^1$ of serving cell c, a second PUSCH transmission on active UL BWP $b_2$ of carrier $f_2$ of serving cell $c_2$ that overlaps with the first PUSCH transmission if:

the second PUSCH transmission is in response to detection of a DCI format 0_0 or a DCI format 0_1 in a PDCCH received in a second PDCCH monitoring occasion, and the second PDCCH monitoring occasion is after a first PDCCH monitoring occasion where the WD detects a first DCI format 0_0 or DCI format 0_1 scheduling the first PUSCH transmission.

If the WD determines that a Type 1 power headroom report for an activated serving cell is based on a reference PUSCH transmission then, for PUSCH transmission occasion i on UL BWP b of carrier f of serving cell c, the WD computes the Type 1 power headroom report as $PH_{type,b,f,c}(i,j,q_d,k)=\tilde{P}_{CMAX,f,c}(i)-\{P_{O\_PUSCH,b,f,c}(j)+\alpha_{b,f,c}(j)\cdot PL_{b,f,c}(q_d)+f_{b,f,c}(i,l)\}$ [dB], where $\tilde{P}_{CMAX,f,c}(i)$ is computed assuming MPR=0 dB, A-MPR=0 dB, P-MPR=0 dB. $\Delta$TC=0 dB. MPR, A-MPR, P-MPR and $\Delta$TC are defined in [8-1, Technical Specification (TS) 38.101-1] and [8-2, TS 38.101-2]. The remaining parameters are defined in Subclause 7.1.1 of TS 38.213 V15.2.0, where $P_{O\_PUSCH,b,f,c}(j)$ and $\alpha_{b,f,c}(j)$ are provided from p0-PUSCH-AlphaSetId=0 for the UL BWP b of carrier of serving cell c, $PL_{b,f,c}$ $(q_d)$ is obtained using PathlossReferenceRS-Id=0, and l=0.

If a WD is configured with two UL carriers for a serving cell and the WD determines a Type 1 power headroom report for the serving cell based on a reference PUSCH transmission, the WD computes a Type 1 power headroom report for the serving cell assuming a reference PUSCH transmission on the UL carrier provided by higher layer parameter pusch-Config. If the WD is provided higher layer parameter pusch-Config for both UL carriers, the WD computes a Type 1 power headroom report for the serving cell assuming a reference PUSCH transmission on the UL carrier provided by higher layer parameter pucch-Config. If pucch-Config is not configured, the WD computes a Type 1 power headroom report for the serving cell assuming a reference PUSCH transmission on the non-supplementary UL carrier.

Type 3 PH Report

If a WD determines that a Type 3 power headroom report for an activated serving cell is based on an actual SRS transmission then, for SRS transmission occasion i on active UL BWP b of carrier f of serving cell c and if the WD is not configured for PUSCH transmissions on carrier f of serving cell c, the WD computes a Type 3 power headroom report as $PH_{type3,b,f,c}(i,q_s)=P_{CMAX1,f,c}(i)-\{P_{O\_SRS,b,f,c}(q_s)+10\ \log_{10}$ $(2^\mu \cdot M_{SRS,b,f,c}(i)+\alpha_{SRS,b,f,c}(q_s)\cdot PL_{b,f,c}(q_d)+h_b$ [dB], where $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ are defined in Subclause 7.3.1 of TS 38.213 V15.2.0.

If the WD determines that a Type 3 power headroom report for an activated serving cell is based on a reference SRS transmission then, for SRS transmission occasion i on UL BWP b of carrier f of serving cell c, and if the WD is not configured for PUSCH transmissions on UL BWP b of carrier f of serving cell c, the WD computes a Type 3 power headroom report as $PH_{type3,b,f,c}(i,q_s)=\tilde{P}_{CMAX,f,c}(i)-\{P_{O\_SRS,b,f,c}(q_s)+\alpha_{SRS,b,f,c}(q_s)\cdot PL_{b,f,c}(q_q)+h_{f,c}(i)\}$ [dB], where is a SRS resource set corresponding to SRS-ResourceSetId=0 and $P_{O\_SRS,b,f,c}(q_s)$, $\alpha_{SRS,f,c}(q_s)$, $PL_{b,f,c}$ $(q_d)$ and $h_{b,f,c}(i)$ and are defined in Subclause 7.3.1 of TS 38.213 V15.2.0 with corresponding values obtained from SRS-ResourceSetId=0. $\tilde{P}_{CMAX,f,c}(i)$ is computed assuming MPR=0 dB, A-MPR=0 dB, P-MPR=0 dB and $\Delta$TC=0 dB. MPR, A-MPR, P-MPR and $\Delta$TC are defined in [8-1, TS 38.101-1] and [8-2, TS38.101-2].

SUMMARY

Some embodiments advantageously provide methods and apparatuses for PHR reporting determinations in dual-connectivity, where a WD is configured to connect to more than one radio access technology (RAT), such as, for example, Long Term Evolution (LTE) and New Radio (NR).

Some embodiments of the present disclosure provide arrangements for determining the Power Headroom Report (PHR) in the case of DC operation of at least two RATs. Specific examples are described below about DC operation between LTE-NR and NR-LTE. One basic principle of the disclosure is that the PHR report for LTE does not consider any NR transmission in its calculation, whiles the PHR report of NR does consider the transmission of LTE. Accordingly, some embodiments of the disclosure allow for a more efficient WD implementation where the LTE-side WD hardware/software can operate independently, without considering the NR-side transmissions or hardware/software settings.

According to an aspect of the present disclosure, a method implemented in a wireless device, WD, is provided. The method includes operating in dual-connectivity with at least two different radio access technologies, RATs, the at least two different RATs including at least a first RAT and a second RAT. The method includes determining a first power headroom report, PHR, for the first RAT based at least in part on a WD transmission using the first RAT. The method includes determining a second PHR for the second RAT based at least in part on both the WD transmission using the first RAT and the WD transmission using the second RAT. The method includes transmitting based on a received allocation information, the allocation information based at least in part on at least one of the determined first PHR and the determined second PHR.

In some embodiments of this aspect, the determining the first PHR for the first RAT based at least in part on the WD transmission using the first RAT further includes determining the first PHR for the first RAT independent of the WD transmission using the second RAT. In some embodiments of this aspect, the method includes determining a maximum transmit power value for the first PHR for the first RAT using at least one of a power class value of the WD, a maximum allowed power value for the first RAT, and at least one of a maximum power reduction value for the first RAT and a backoff value for the first RAT. In some embodiments of this aspect, the method includes determining a maximum transmit power value for the second PHR for the second RAT based at least in part on the WD transmission using the first RAT. In some embodiments of this aspect, the method includes determining a maximum transmit power value for the second PHR for the second RAT using at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT. In some embodiments of this aspect, the method includes determining a total power limit for both the WD transmission using the first RAT and the WD transmission using the second RAT.

In some embodiments of this aspect, the method includes determining whether the WD transmission using the first RAT and the WD transmission using the second RAT are simultaneous. In some embodiments of this aspect, the method includes, if the WD transmission using the first RAT and the WD transmission using the second RAT are simultaneous, determining a first total power limit value based at least in part on a power class value of the WD and an additional maximum power reduction, A-MPR. In some embodiments of this aspect, the method includes, if the WD transmission using the first RAT and the WD transmission using the second RAT are not simultaneous, determining a second total power limit value based at least in part on a power class value of the WD.

In some embodiments of this aspect, the method further includes determining whether a total transmission power of the WD using the first RAT and the second RAT exceeds a total power limit; and if the total transmission power of the WD exceeds the total power limit, reducing a transmission power of the WD on the second RAT to a value that reduces the total transmission power of the WD to most meet the total power limit. In some embodiments of this aspect, the method further includes communicating the determined first PHR for the first RAT; and communicating the determined second PHR for the second RAT. In some embodiments of this aspect, the first RAT is Long Term Evolution, LTE, and the second RAT is New Radio, NR. In some embodiments of this aspect, determining the PHR for the first RAT further comprises, while operating in the dual-connectivity, calculating the PHR for LTE independent of NR-side WD transmissions; and determining the PHR for the second RAT further comprises, while operating in the dual-connectivity, calculating the PHR for NR based at least in part on LTE-side WD transmissions.

According to another aspect of the present disclosure, a method implemented in a network node is provided. The method includes receiving at least one of: a first power headroom report, PHR, for a first radio access technology, RAT, from a wireless device, WD, the first PHR being determined based at least in part on a WD transmission using the first RAT; and a second power headroom report, PHR, for a second RAT from the WD, the second PHR being determined based at least in part on both the WD transmission using the first RAT and the WD transmission using the second RAT. The method includes transmitting allocation information, the allocation information based at least in part on the received at least one of the first PHR and the second PHR.

In some embodiments of this aspect, the first PHR for the first RAT is determined independent of the WD transmission using the second RAT. In some embodiments of this aspect, the first PHR for the first RAT is based at least in part on a maximum transmit power value, the maximum transmit power value based at least in part on at least one of a power class value of the WD, a maximum allowed power value for the first RAT, and at least one of a maximum power reduction value for the first RAT and a backoff value for the first RAT. In some embodiments of this aspect, the second PHR for the second RAT is based at least in part on a maximum transmit power value, the maximum transmit power value based at least in part on the WD transmission using the first RAT. In some embodiments of this aspect, the second PHR for the second RAT is based at least in part on a maximum transmit power value, the maximum transmit power value based at least in part at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

In some embodiments of this aspect, the method further includes receiving, from the WD, a transmission at one of a first total power limit value and a second total power limit value, which one of the first and second total power limit value based at least in part on whether the WD transmission using the first RAT and the WD transmission using the second RAT are simultaneous. In some embodiments of this aspect, the first RAT is Long Term Evolution, LTE, and the second RAT is New Radio, NR.

According to yet another aspect of the present disclosure, a wireless device, WD, configured to communicate with a network node is provided. The WD includes processing circuitry. The processing circuitry is configured to cause the WD to operate in dual-connectivity with at least two different radio access technologies, RATs, the at least two different RATs including at least a first RAT and a second RAT. The processing circuitry is configured to cause the WD to determine a first power headroom report, PHR, for the first RAT based at least in part on a WD transmission using the first RAT. The processing circuitry is configured to cause the WD to determine a second PHR for the second RAT based at least in part on both the WD transmission using the first RAT and the WD transmission using the second RAT. The processing circuitry is configured to cause the WD to transmit based on a received allocation information, the allocation information based at least in part on at least one of the determined first PHR and the determined second PHR.

In some embodiments of this aspect, the processing circuitry is further configured to cause the WD to determine the first PHR for the first RAT based at least in part on the WD transmission using the first RAT by being configured to determine the first PHR for the first RAT independent of the WD transmission using the second RAT. In some embodiments of this aspect, the processing circuitry is further configured to cause the WD to determine a maximum transmit power value for the first PHR for the first RAT using at least one of a power class value of the WD, a maximum allowed power value for the first RAT, and at least one of a maximum power reduction value for the first RAT and a backoff value for the first RAT. In some embodiments of this aspect, the processing circuitry is further configured to cause the WD to determine a maximum transmit power value for the second PHR for the second RAT based at least in part on the WD transmission using the first RAT.

In some embodiments of this aspect, the processing circuitry is further configured to cause the WD to determine a maximum transmit power value for the second PHR for the second RAT using at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT. In some embodiments of this aspect, the processing circuitry is further configured to cause the WD to determine a total power limit for both the WD transmission using the first RAT and the WD transmission using the second RAT.

In some embodiments of this aspect, the processing circuitry is further configured to cause the WD to determine whether the WD transmission using the first RAT and the WD transmission using the second RAT are simultaneous. In some embodiments of this aspect, the processing circuitry is further configured to cause the WD to, if the WD transmission using the first RAT and the WD transmission using the second RAT are simultaneous, determine a first total power limit value based at least in part on a power class value of the WD and an additional maximum power reduction, A-MPR. In some embodiments of this aspect, the processing circuitry is further configured to cause the WD to, if the WD transmission using the first RAT and the WD transmission using the second RAT are not simultaneous, determine a second total power limit value based at least in part on a power class value of the WD.

In some embodiments of this aspect, the processing circuitry is further configured to cause the WD to determine whether a total transmission power of the WD on the first RAT and the second RAT exceeds a total power limit; and if the total transmission power of the WD exceeds the total power limit, reduce a transmission power of the WD on the second RAT to a value that reduces the total transmission power of the WD to most meet the total power limit. In some embodiments of this aspect, the processing circuitry is further configured to cause the WD to communicate the determined PHR for the first RAT; and communicate the determined second PHR for the second RAT. In some embodiments of this aspect, the first RAT is Long Term Evolution, LTE, and the second RAT is New Radio, NR. In some embodiments of this aspect, the processing circuitry is further configured to cause the WD to determine the PHR for the first RAT by being configured to, while operating in the dual-connectivity, calculate the PHR for LTE independent of NR-side WD transmissions; and determine the PHR for the second RAT by being configured to, while operating in the dual-connectivity, calculate the PHR for NR based at least in part on LTE-side WD transmissions.

According to another aspect of the present disclosure, a network node configured to communicate with a wireless device, WD, is provided. The network node includes processing circuitry. The processing circuitry is configured to cause the network node to receive at least one of: a first power headroom report, PHR, for a first radio access technology, RAT, from the WD, the first PHR being determined based at least in part on a WD transmission using the first RAT; and a second power headroom report, PHR, for a second RAT from the WD, the second PHR being determined based at least in part on both the WD transmission using the first RAT and the WD transmission using the second RAT. The processing circuitry is configured to cause the network node to transmit allocation information, the allocation information based at least in part on the received at least one of the first PHR and the second PHR.

In some embodiments of this aspect, the first PHR for the first RAT is determined independent of the WD transmission using the second RAT. In some embodiments of this aspect, the first PHR for the first RAT is based at least in part on a maximum transmit power value, the maximum transmit power value based at least in part on at least one of a power class value of the WD, a maximum allowed power value for the first RAT, and at least one of a maximum power reduction value for the first RAT and a backoff value for the first RAT. In some embodiments of this aspect, the second PHR for the second RAT is based at least in part on a maximum transmit power value, the maximum transmit power value based at least in part on the WD transmission using the first RAT. In some embodiments of this aspect, the second PHR for the second RAT is based at least in part on a maximum transmit power value, the maximum transmit power value based at least in part at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

In some embodiments of this aspect, the processing circuitry is further configured to cause the network node to receive, from the WD, a transmission at one of a first total power limit value and a second total power limit value, which one of the first and second total power limit value based at least in part on whether the WD transmission using the first RAT and the WD transmission using the second RAT are simultaneous. In some embodiments of this aspect, the first RAT is Long Term Evolution, LTE, and the second RAT is New Radio, NR.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flow chart illustrating exemplary methods implemented in a communication system including a host computer, a network node and a wireless device for executing a client application at a wireless device according to some embodiments of the present disclosure;

FIG. 4 is a flow chart illustrating exemplary methods implemented in a communication system including a host computer, a network node and a wireless device for receiving user data at a wireless device according to some embodiments of the present disclosure;

FIG. 5 is a flow chart illustrating exemplary methods implemented in a communication system including a host computer, a network node and a wireless device for receiving user data from the wireless device at a host computer according to some embodiments of the present disclosure;

FIG. 6 is a flow chart illustrating exemplary methods implemented in a communication system including a host computer, a network node and a wireless device for receiving user data at a host computer according to some embodiments of the present disclosure;

DETAILED DESCRIPTION

Figure 1:
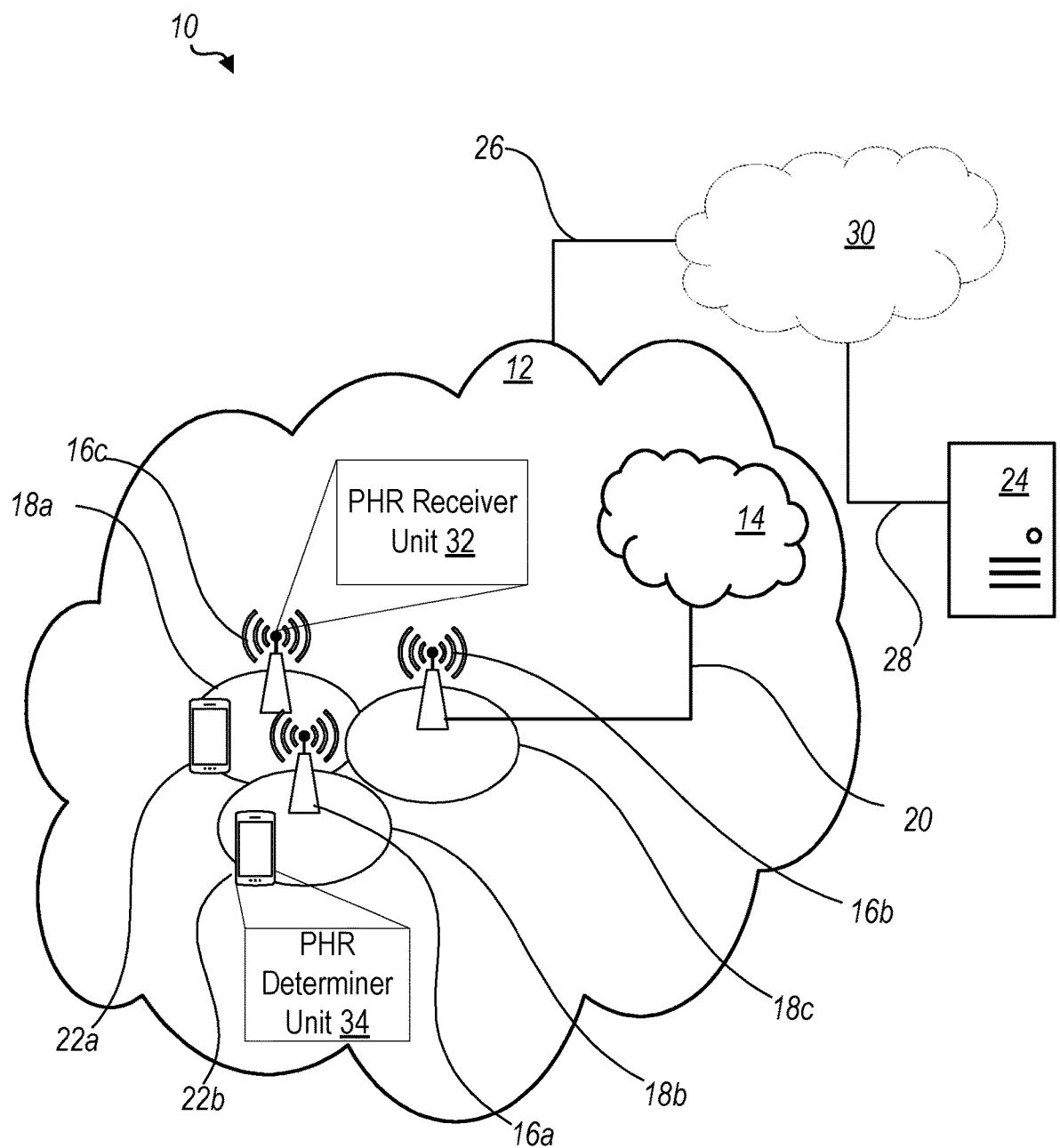
FIG. 1 is a schematic diagram of an exemplary network architecture illustrating a communication system connected via an intermediate network to a host computer according to the principles in the present disclosure.

Existing PHR reporting does not address how to determine PHR reporting for Evolved Universal Terrestrial Radio Access (E-UTRA)-NR Dual Connectivity (EN-DC) and NR-E-UTRA Dual Connectivity (NE-DC) operation. At least one of the problems is that the Long Term Evolution (LTE) and NR side operate on different processing timelines. Generally, NR can be said to possess quicker processing then LTE. This may imply that the LTE schedule for an UL transmission (e.g., PUSCH, PUCCH, PRACH or SRS) can generally happen at an earlier stage in time compared to the NR side, even if the transmission will be transmitted in an overlapping fashion in time (i.e., simultaneously).

We note that EN-DC has LTE as MCG and NR as SCG. NE-DC has NR as MCG and LTE as SCG.

Thus, the present disclosure provides mechanisms for determining the PHR in case of DC operation of at least two RATs. Specific examples are described below regarding DC operation between LTE-NR and NR-LTE. One basic principle of the disclosure is that the PHR report for LTE does not consider any NR transmission in its calculation, whiles the PHR report of NR does consider the transmission of LTE.

Accordingly, some embodiments of the disclosure allow for a more efficient WD implementation where the LTE-side WD hardware/software can operate independently compared with other solutions, without considering the NR-side transmissions or hardware/software settings.

Before describing in detail exemplary embodiments, it is noted that the embodiments reside primarily in combinations of apparatus components and processing steps related to PHR reporting determinations. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Any two or more embodiments described in this disclosure may be combined in any way with each other. In some embodiments, the term "simultaneous" may be used to indicate transmissions that at least partly overlap in time with one another.

Configuring a radio node, in particular a terminal or WD, may refer to the radio node being adapted or caused or set and/or instructed to operate according to the configuration (e.g., to monitor an x-RNTI or a binary sequence for C-RNTI to determine which table to be used to interpret an indication or signal). Configuring may be done by another device, e.g., a network node (for example, a base station or gNB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, which may be allocated by the network node based, for example, on one or more PHR reports, determined according to one or more of the techniques disclosed herein. A radio node may configure itself, e.g., based on configuration data received from a network or network node. A network node may utilize, and/or be adapted to utilize, its circuitry/ies for configuring. Allocation information (e.g., UL grant, which may be transmitted by the network node in a downlink control information message) may be considered a form of configuration data. Configuration data may comprise and/or be represented by configuration information, and/or one or more corresponding indications and/or message/s.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. In some embodiments, the channels described herein may be uplink channels.

Transmitting in downlink may pertain to transmission from the network or network node to the wireless device. The wireless device may be considered the WD or UE. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Returning to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a PHR receiver unit 32, which is configured to one or more of receive at least one of: a first power headroom report, PHR, for a first radio access technology, RAT, from the WD, the first PHR being determined based at least in part on a WD transmission using the first RAT; and a second power headroom report, PHR, for a second RAT from the WD, the second PHR being determined based at least in part on both the WD transmission using the first RAT and the WD transmission using the second RAT; and transmit allocation information, the allocation information based at least in part on the received at least one of the first PHR and the second PHR. In some embodiments, PHR receiver unit 32 is configured to receive a first power headroom report (PHR) for a first RAT from the WD, the first PHR determined based on a transmission on the first RAT and without being based on a transmission on the second RAT; and receive a second power headroom report (PHR) for a second RAT from the WD, the second PHR determined based on both the transmission on the first RAT and the transmission on the second RAT.

In some embodiments, the first RAT is different from the second RAT. In some embodiments, the PHR receiver unit 32 is further configured to use the first PHR and the second PHR to configure communications with the WD 22.

A wireless device 22 is configured to include a PHR determiner unit 34 which is configured to one or more of operate in dual-connectivity with at least two different radio access technologies, RATs, the at least two different RATs including at least a first RAT and a second RAT; determine a first power headroom report, PHR, for the first RAT based at least in part on a WD transmission using the first RAT; determine a second PHR for the second RAT based at least in part on both the WD transmission using the first RAT and the WD transmission using the second RAT; and transmit based on a received allocation information, the allocation information based at least in part on at least one of the determined first PHR and the determined second PHR. In some embodiments, PHR determiner unit 34 is configured to provide dual-connectivity to at least different radio access technologies (RATs), the at least two different RATs including at least a first RAT and a second RAT; determine a first power headroom report (PHR) for the first RAT based on a transmission on the first RAT and without being based on a transmission on the second RAT; and determine a second PHR for the second RAT based on both the transmission on the first RAT and the transmission on the second RAT.

In some embodiments, the PHR determiner unit 34 is configured to determine a maximum transmit power value for the first PHR for the first RAT using at least one of a power class value of the WD 22, a maximum allowed power value for the first RAT, and at least one of a maximum power reduction value for the first RAT and a backoff value for the first RAT. In some embodiments, the PHR determiner unit 34 is configured to determine a maximum transmit power value for the second PHR for the second RAT based at least in part on the transmission on the first RAT. In some embodiments, the PHR determiner unit 34 is configured to determine a maximum transmit power value for the second PHR for the second RAT using at least one of a power class value of the WD 22, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT. In some embodiments, the PHR determiner unit 34 is further configured to determine a total power limit for both the transmission on the first RAT and the transmission on the second RAT. In some embodiments, the PHR determiner unit 34 is further configured to determine whether the transmission on the first RAT and the transmission on the second RAT are simultaneous; if the transmission on the first RAT and the transmission on the second RAT are simultaneous, determine a first total power limit value based on a power class value of the WD 22 and an additional maximum power reduction (A-MPR); and if the transmission on the first RAT and the transmission on the second RAT are not simultaneous, determine a second total power limit value based on a power class value of the WD 22. In some embodiments, the PHR determiner unit 34 is further configured to determine whether a total transmission power of the WD 22 on the first RAT and the second RAT exceeds a total power limit; and if the total transmission power of the WD 22 exceeds the total power limit, reduce a transmission power of the WD 22 on the second RAT to a value that reduces the total transmission power of the WD 22 to most meet the total power limit. In some embodiments, the PHR determiner unit 34 is further configured to communicate the determined first power headroom report (PHR) for the first RAT to the network node 16; and communicate the determined second power headroom report (PHR) for the second RAT to the network node 16.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16, such as for example the network node processes described with reference to the flowchart in FIG. 7. For example, processing circuitry 68 of the network node 16 may include PHR receiver unit 32 configured to receive a first power headroom report (PHR) for a first RAT from the WD, the first PHR determined based on a transmission on the first RAT and without being based on a transmission on the second RAT; and/or receive a second power headroom report (PHR) for a second RAT from the WD, the second PHR determined based on both the transmission on the first RAT and the transmission on the second RAT. In some embodiments, the first RAT is different from the second RAT. In some embodiments, the PHR receiver unit 32 is further configured to use the first PHR and the second PHR to configure communications with the WD 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22, such as, for example, the WD processes described with reference to the flowchart in FIG. 8. For example, the processing circuitry 84 of the wireless device 22 may include a PHR determiner unit 34 configured to provide dual-connectivity to at least different radio access technologies (RATs), the at least two different RATs including at least a first RAT and a second RAT; determine a first power headroom report (PHR) for the first RAT based on a transmission on the first RAT and without being based on a transmission on the second RAT; and determine a second PHR for the second RAT based on both the transmission on the first RAT and the transmission on the second RAT.

In some embodiments, the PHR determiner unit 34 is configured to determine a maximum transmit power value for the first PHR for the first RAT using at least one of a power class value of the WD 22, a maximum allowed power value for the first RAT, and at least one of a maximum power reduction value for the first RAT and a backoff value for the first RAT. In some embodiments, the PHR determiner unit 34 is configured to determine a maximum transmit power value for the second PHR for the second RAT based at least in part on the transmission on the first RAT. In some embodiments, the PHR determiner unit 34 is configured to determine a maximum transmit power value for the second PHR for the second RAT using at least one of a power class value of the WD 22, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT. In some embodiments, the PHR determiner unit 34 is further configured to determine a total power limit for both the transmission on the first RAT and the transmission on the second RAT. In some embodiments, the PHR determiner unit 34 is further configured to determine whether the transmission on the first RAT and the transmission on the second RAT are simultaneous; if the transmission on the first RAT and the transmission on the second RAT are simultaneous, determine a first total power limit value based on a power class value of the WD 22 and an additional maximum power reduction (A-MPR); and if the transmission on the first RAT and the transmission on the second RAT are not simultaneous, determine a second total power limit value based on a power class value of the WD 22. In some embodiments, the PHR determiner unit 34 is further configured to determine whether a total transmission power of the WD 22 on the first RAT and the second RAT exceeds a total power limit; and if the total transmission power of the WD 22 exceeds the total power limit, reduce a transmission power of the WD 22 on the second RAT to a value that reduces the total transmission power of the WD 22 to most meet the total power limit. In some embodiments, the PHR determiner unit 34 is further configured to communicate the determined first power headroom report (PHR) for the first RAT to the network node 16; and communicate the determined second power headroom report (PHR) for the second RAT to the network node 16.

Figure 2:
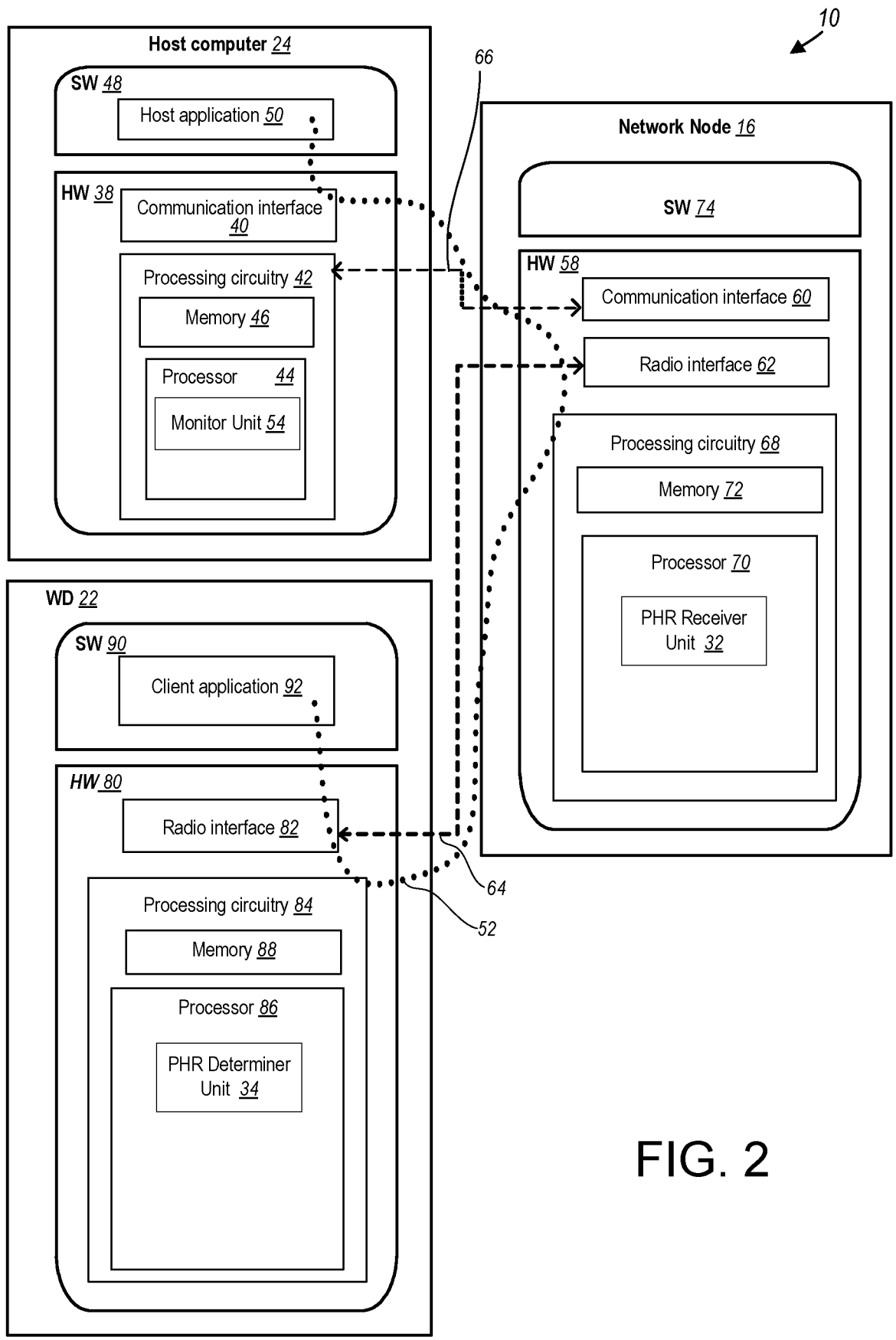
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as PHR receiver unit 32, and PHR determiner unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 7:
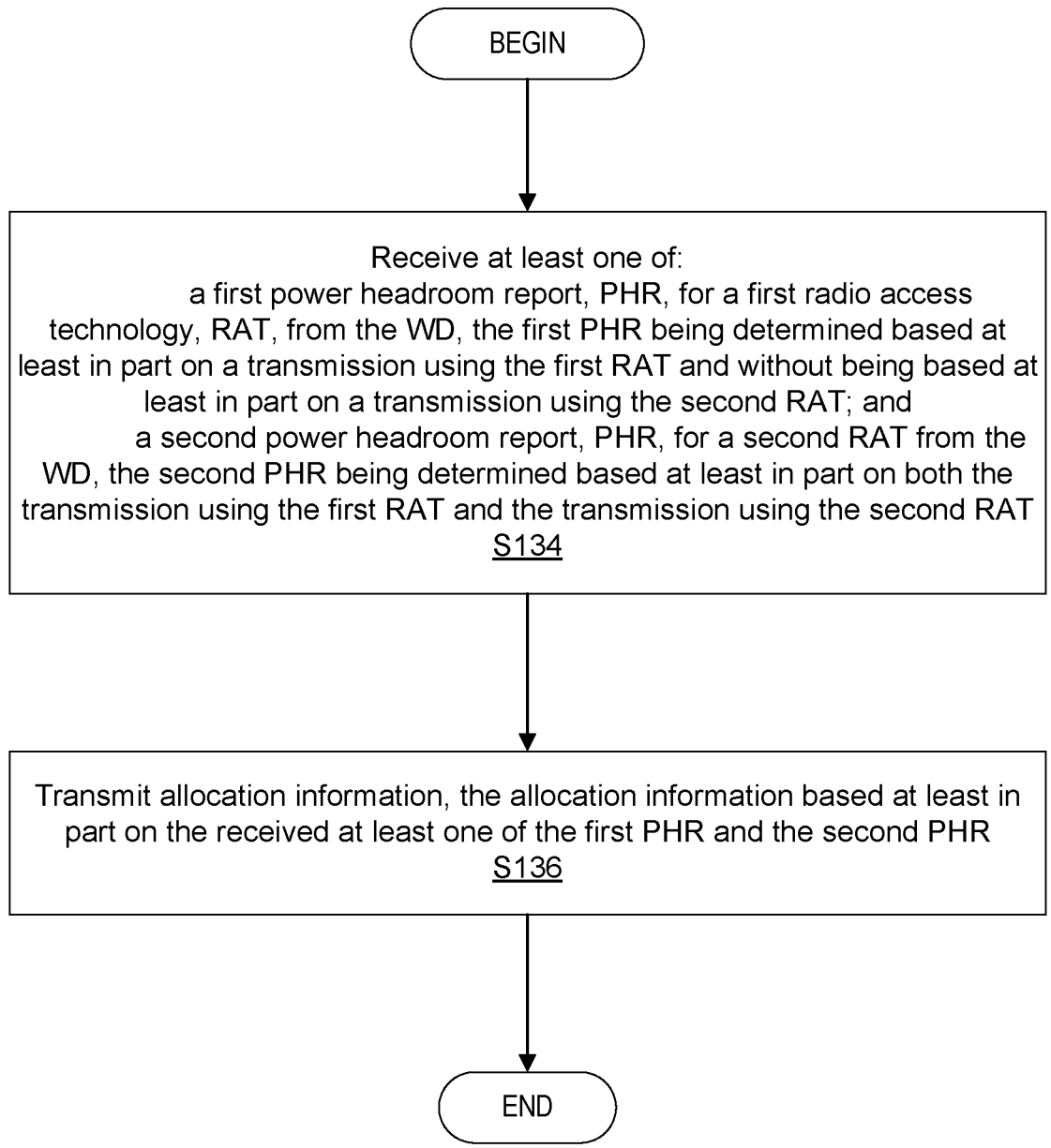
FIG. 7 is a flowchart of an exemplary process in a network node for PHR receiver according to some embodiments of the present disclosure.

FIG. 7 is a flowchart of an exemplary process in a network node 16 according to some embodiments of the present disclosure. One or more Blocks and/or functions and/or methods performed by the network node 16 may be performed by one or more elements of network node 16 such as by PHR receiver unit 32 in processing circuitry 68, processor 70, radio interface 62, etc. according to the example method. The example method includes receiving (block S134), such as via PHR receiver unit 32, processing circuitry 68, processor 70 and/or radio interface 62, at least one of a first power headroom report, PHR, for a first radio access technology, RAT, from a wireless device, WD, the first PHR being determined based at least in part on a WD transmission using the first RAT; and a second power headroom report, PHR, for a second RAT from the WD, the second PHR being determined based at least in part on both the WD transmission using the first RAT and the WD transmission using the second RAT. The method includes transmitting (block S136), such as via PHR receiver unit 32, processing circuitry 68, processor 70 and/or radio interface 62, allocation information, the allocation information based at least in part on the received at least one of the first PHR and the second PHR.

In some embodiments, the first PHR for the first RAT is determined independent of the WD transmission using the second RAT. In some embodiments, the first PHR for the first RAT is based at least in part on a maximum transmit power value, the maximum transmit power value based at least in part on at least one of a power class value of the WD, a maximum allowed power value for the first RAT, and at least one of a maximum power reduction value for the first RAT and a backoff value for the first RAT. In some embodiments, the second PHR for the second RAT is based at least in part on a maximum transmit power value, the maximum transmit power value based at least in part on the WD transmission using the first RAT. In some embodiments, the second PHR for the second RAT is based at least in part on a maximum transmit power value, the maximum transmit power value based at least in part at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

In some embodiments, the method further includes receiving, such as via PHR receiver unit 32, processing circuitry 68, processor 70 and/or radio interface 62, from the WD, a transmission at one of a first total power limit value and a second total power limit value, which one of the first and second total power limit value based at least in part on whether the WD transmission using the first RAT and the WD transmission using the second RAT are simultaneous. In some embodiments, the first RAT is Long Term Evolution, LTE, and the second RAT is New Radio, NR.

In some embodiments, the method includes receiving a first power headroom report (PHR) for a first RAT from the WD 22, the first PHR determined based on a transmission on the first RAT and without being based on a transmission on the second RAT The process further includes receiving a second power headroom report (PHR) for a second RAT from the WD 22, the second PHR determined based on both the transmission on the first RAT and the transmission on the second RAT.

In some embodiments, the first RAT is different from the second RAT. In some embodiments, the method further includes using the first PHR and the second PHR to configure communications with the WD 22.

Figure 8:
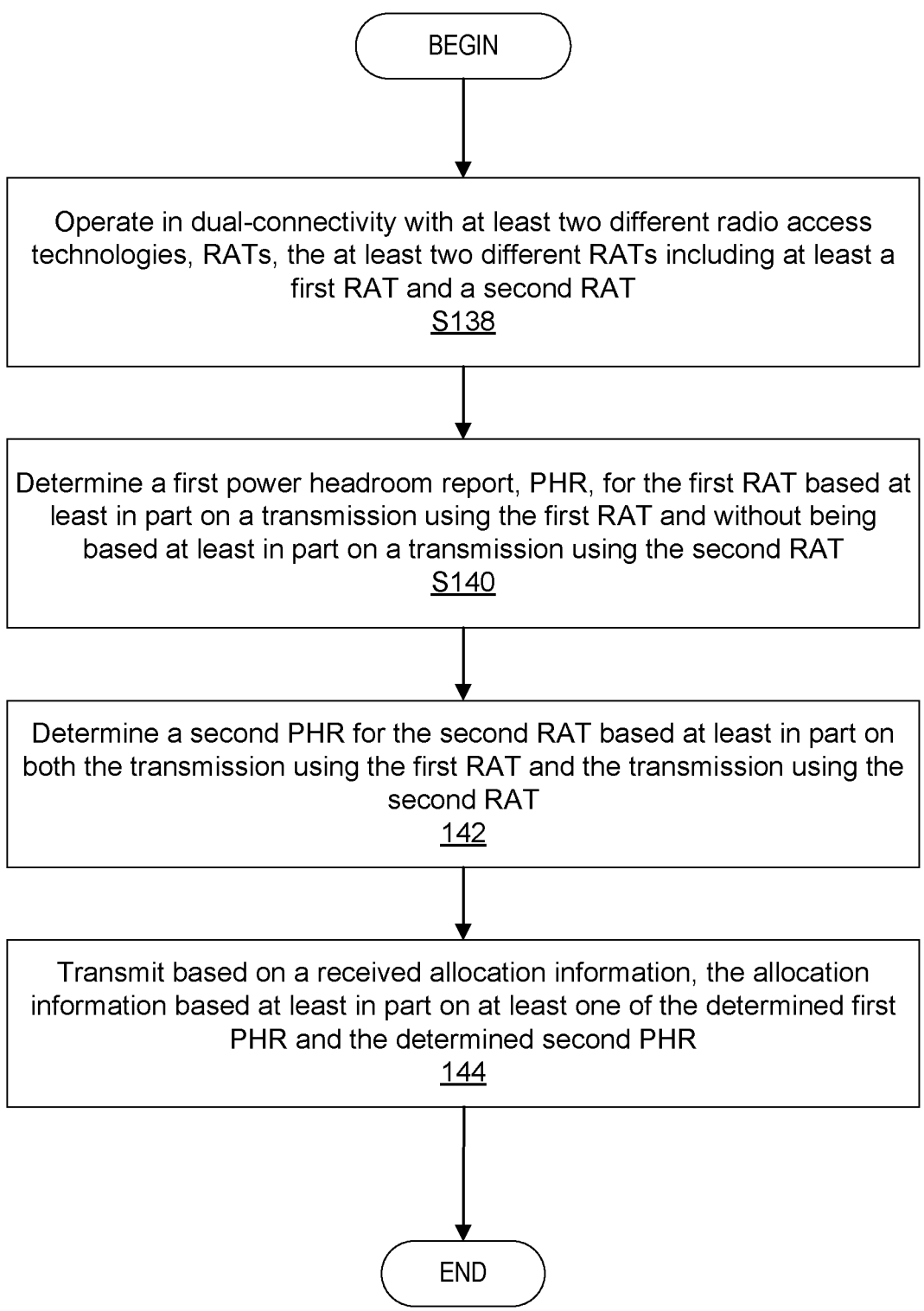
FIG. 8 is a flowchart of an exemplary process in a wireless device for PHR determiner according to some embodiments of the present disclosure.

FIG. 8 is a flowchart of an exemplary process in a wireless device 22 according to some embodiments of the present disclosure. One or more Blocks and/or functions and/or methods performed by WD 22 may be performed by one or more elements of WD 22 such as by PHR determiner unit 34 in processing circuitry 84, processor 86, radio interface 82, etc. The example method includes operating (S138), such as via PHR determiner unit 34, processing circuitry 84, processor 86 and/or radio interface 82, in dual-connectivity with at least two different radio access technologies, RATs, the at least two different RATs including at least a first RAT and a second RAT. The method includes determining (S140), such as via PHR determiner unit 34, processing circuitry 84, processor 86 and/or radio interface 82, a first power headroom report, PHR, for the first RAT based at least in part on a WD transmission using the first RAT. The method includes determining (S142), such as via PHR determiner unit 34, processing circuitry 84, processor 86 and/or radio interface 82, a second PHR for the second RAT based at least in part on both the WD transmission using the first RAT and the WD transmission using the second RAT. The method includes transmitting (S144), such as via PHR determiner unit 34, processing circuitry 84, processor 86 and/or radio interface 82, based on a received allocation information, the allocation information based at least in part on at least one of the determined first PHR and the determined second PHR.

In some embodiments, the determining the first PHR for the first RAT based at least in part on the WD transmission using the first RAT further includes determining, such as via PHR determiner unit 34, processing circuitry 84, processor 86 and/or radio interface 82, the first PHR for the first RAT independent of the WD transmission using the second RAT. In some embodiments, the method includes determining, such as via PHR determiner unit 34, processing circuitry 84, processor 86 and/or radio interface 82, a maximum transmit power value for the first PHR for the first RAT using at least one of a power class value of the WD, a maximum allowed power value for the first RAT, and at least one of a maximum power reduction value for the first RAT and a backoff value for the first RAT. In some embodiments, the method includes determining, such as via PHR determiner unit 34, processing circuitry 84, processor 86 and/or radio interface 82, a maximum transmit power value for the second PHR for the second RAT based at least in part on the WD transmission using the first RAT. In some embodiments, the method includes determining, such as via PHR determiner unit 34, processing circuitry 84, processor 86 and/or radio interface 82, a maximum transmit power value for the second PHR for the second RAT using at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

In some embodiments, the method further includes determining, such as via PHR determiner unit 34, processing circuitry 84, processor 86 and/or radio interface 82, a total power limit for both the WD transmission using the first RAT and the WD transmission using the second RAT. In some embodiments, the method further includes determining, such as via PHR determiner unit 34, processing circuitry 84, processor 86 and/or radio interface 82, whether the WD transmission using the first RAT and the WD transmission using the second RAT are simultaneous. In some embodiments, the method includes if the WD transmission using the first RAT and the WD transmission using the second RAT are simultaneous, determining, such as via PHR determiner unit 34, processing circuitry 84, processor 86 and/or radio interface 82, a first total power limit value based at least in part on a power class value of the WD and an additional maximum power reduction, A-MPR. In some embodiments, the method includes if the WD transmission using the first RAT and the WD transmission using the second RAT are not simultaneous, determining, such as via PHR determiner unit 34, processing circuitry 84, processor 86 and/or radio interface 82, a second total power limit value based at least in part on a power class value of the WD.

In some embodiments, the method further includes determining, such as via PHR determiner unit 34, processing circuitry 84, processor 86 and/or radio interface 82, whether a total transmission power of the WD using the first RAT and the second RAT exceeds a total power limit; and if the total transmission power of the WD exceeds the total power limit, reducing a transmission power of the WD on the second RAT to a value that reduces the total transmission power of the WD to most meet the total power limit. In some embodiments, the method further includes communicating, such as via PHR determiner unit 34, processing circuitry 84, processor 86 and/or radio interface 82, the determined first PHR for the first RAT; and communicating, such as via PHR determiner unit 34, processing circuitry 84, processor 86 and/or radio interface 82, the determined second PHR for the second RAT.

In some embodiments, the first RAT is Long Term Evolution, LTE, and the second RAT is New Radio, NR. In some embodiments, determining the PHR for the first RAT further comprises, while operating in the dual-connectivity, calculating, such as via PHR determiner unit 34, processing circuitry 84, processor 86 and/or radio interface 82, the PHR for LTE independent of NR-side WD transmissions. In some embodiments, determining the PHR for the second RAT further comprises, while operating in the dual-connectivity, calculating, such as via PHR determiner unit 34, processing circuitry 84, processor 86 and/or radio interface 82, the PHR for NR based at least in part on LTE-side WD transmissions.

In some embodiments, the process includes providing dual-connectivity to at least different radio access technologies (RATs), the at least two different RATs including at least a first RAT and a second RAT. The process includes determining a first power headroom report (PHR) for the first RAT based on a transmission on the first RAT and without being based on a transmission on the second RAT. The process includes determining a second PHR for the second RAT based on both the transmission on the first RAT and the transmission on the second RAT.

In some embodiments of this process, the method further includes determining a maximum transmit power value for the first PHR for the first RAT using at least one of a power class value of the WD 22, a maximum allowed power value for the first RAT, and at least one of a maximum power reduction value for the first RAT and a backoff value for the first RAT. In some embodiments, the method further includes determining a maximum transmit power value for the second PHR for the second RAT based at least in part on the transmission on the first RAT. In some embodiments, the method further includes determining a maximum transmit power value for the second PHR for the second RAT using at least one of a power class value of the WD 22, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT. In some embodiments, the method further includes determining a total power limit for both the transmission on the first RAT and the transmission on the second RAT. In some embodiments, the method further includes determining whether the transmission on the first RAT and the transmission on the second RAT are simultaneous; if the transmission on the first RAT and the transmission on the second RAT are simultaneous, determining a first total power limit value based on a power class value of the WD 22 and an additional maximum power reduction (A-MPR); and if the transmission on the first RAT and the transmission on the second RAT are not simultaneous, determining a second total power limit value based on a power class value of the WD 22.

In some embodiments, the method further includes determining whether a total transmission power of the WD 22 on the first RAT and the second RAT exceeds a total power limit; and if the total transmission power of the WD 22 exceeds the total power limit, reducing a transmission power of the WD 22 on the second RAT to a value that reduces the total transmission power of the WD 22 to most meet the total power limit. In some embodiments, the method further includes communicating the determined first power headroom report (PHR) for the first RAT to the network node 16; and communicating the determined second power headroom report (PHR) for the second RAT to the network node 16.

Having described some embodiments of the present disclosure related to PHR determination and/or receipt, a more detailed description of some of the embodiments will now be described below.

Embodiment 1

In a first embodiment, the WD 22 determines the PHR report for the first RAT, when the WD 22 is also configured with a second RAT. Independent of whether there is a transmission on the second RAT, the WD 22 may determine the corresponding PHR based on the transmissions only on the first RAT. The transmit power of the physical channel(s)/signal(s) transmitted by the WD 22 for the first RAT may be bounded by a first configured maximum transmit power value (referred to herein as P_cmax1). The transmit power of the physical channel(s)/signal(s) transmitted by the WD 22 for at least the second RAT may be bounded by a second configured maximum transmit power value (referred to herein as P_cmax2). This may correspond to determining the set of the following parameters based on the first RATs transmission.

The WD 22 determines P_cmax1 in the PHR calculation using at least the following:
- A power class value that the WD 22 indicates to the network (e.g., network node 16) as part of WD 22 capability signaling (referred to herein as P_powerclass);
- A maximum allowed power value for the first RAT (referred to herein as P_RAT1); and
- At least one of:
  - a first maximum power reduction value (referred to herein as MPR1),
  - a first backoff value (referred to herein as BO1).

In a second embodiment, the WD 22 determines the PHR report for the second RAT when also configured with a first RAT. The WD 22 may determine the corresponding PHR for the second RAT by also considering potential transmission on the first RAT. This may correspond to determining the set of the following parameters based on the first RATs transmission:

The WD 22 determines P_cmax2 in the PRH calculation using at least the following
   P_powerclass;
   A maximum allowed power value for the second RAT (P_RAT2); and
   At least one of
      a second maximum power reduction value (MPR2),
      a second backoff value (BO2),
      P_cmax1,
      MPR1, and
      BO1.

MPR1 and/or BO1 can be determined by the WD 22 assuming there is no transmission on the second RAT regardless of whether the WD 22 is scheduled to transmit on the second RAT. For example, if the WD 22 is scheduled to transmit on the first RAT in a first time duration (e.g., subframe/slot x) the WD 22 determines MPR1 and/or BO1 assuming there is no transmission on the second RAT, even if the WD 22 is scheduled to transmit on the second RAT in a time duration that overlaps with the first time duration.

To determine P_cmax2, MPR2 and/or BO2 can be determined by the WD 22 by considering transmissions scheduled for both the first RAT and the second RAT.

Alternatively, MPR2 and/or B02 can be determined by the WD 22 assuming there is no transmission on the first RAT regardless of whether the WD 22 is scheduled to transmit on the first RAT, but the WD 22 uses one of MPR1, BO1, P_cmax1 to determine P_cmax2.

In another embodiment, the WD 22 can use the transmission power of ongoing transmission(s) on the first RAT to determine P_cmax2.

In yet another embodiment, the WD 22 can determine P_cmax2 such that it is lower than min(P_RAT2, P_cmax1) where min( ) gives the minimum value.

In one embodiment, the first RAT can be LTE and the second RAT can be NR (i.e., EN-DC). In another embodiment, the first RAT can be NR and the second RAT can be LTE (i.e., NE-DC). The association with RAT may the same for NE-DC operation, as with the EN-DC operation, even though the MCG and SCG associations of the RATs are switched.

In one embodiment, determining P_cmax1 can comprise determining a lower bound and/or an upper bound for P_cmax1 and using a value that is within these bounds.

In another embodiment, determining P_cmax2 can comprise determining a lower bound and/or an upper bound for P_cmax2 and using a value that is within these bounds.

In another embodiment, the transmit power of the physical channel(s)/signal(s) transmitted by the WD 22 for both the first RAT and second RAT can be bounded by the second configured maximum transmit power value (P_cmax2).

In some embodiments, the physical channel(s)/signal(s) can be one or more of PUSCH, PUCCH, SRS, and PRACH. In other embodiments, the physical channel(s)/signal(s) can be other types of channels and/or signals.

In some embodiments, MPR1 can be based on a number and a position of resource blocks allocated for transmissions corresponding to LTE RAT.

In some embodiments, MPR2 can be based on a number and a position of resource blocks allocated for transmissions corresponding to NR RAT and also LTE RAT. In an alternative embodiment, MPR2 can be based on a number and a position of resource blocks allocated for transmissions corresponding to only NR RAT.

Embodiment 2

In another embodiment, the WD 22 determines a total power limit applicable to transmissions made on a first RAT and transmissions made on a second RAT (P_tot_limit). For example, for a predetermined time duration, e.g., one or more slot(s) or subframe(s), the WD 22 may determine whether there are simultaneous transmissions in the first RAT and the second RAT. If there are simultaneous transmissions, the WD 22 determines P_tot_limit as a first value. The first value can be based on a P_powerclass and a first Additional Maximum Power Reduction (A-MPR). On the other hand, if there is no simultaneous transmission, the WD 22 may determine the P_tot_limit as a second value. The second value can be based on P_powerclass. The second value may be typically higher than the first value. The first A-MPR can be computed based on resource allocation for the WD 22 in the first RAT and the second RAT. The first value can be based on parameters (e.g., resource blocks (RBs) allocated) that can vary from slot to slot dynamically based on physical layer signaling. The second value can be a static value or semi-static value that varies based on higher layer configured parameters but may be invariant to resource allocations on the first and second RATs.

In one embodiment, when determining the transmission power of a transmission on the first RAT (referred to herein as P_1), the WD 22 may assume that there is no simultaneous transmission on the second RAT and may compute P_tot_limit accordingly. The WD 22 may then adjust the transmission power of the first RAT such that it is smaller than P_tot_limit.

In another embodiment, when determining the transmission power of a transmission on the second RAT (referred to herein as P_2), the WD 22 can use the first A-MPR value (i.e., the A-MPR computed based on resource allocation for the WD 22 in the first RAT and the second RAT). The WD 22 may determine whether the total transmission power of the WD 22 across the first RAT and the second RAT (P_1+P_2) exceeds P_tot_limit. If P_1+P_2 exceeds P_tot_limit in the given time duration, the WD 22 may reduce P_2 to a smaller value P_2' such that P_1+P_2'<P_tot_limit.

This embodiment may allow a WD 22 to determine the transmission power on first RAT and second RAT with reduced complexity, while at the same time ensuring that WD 22 does not unnecessarily reduce its power to a smaller value. The complexity reduction may be from the fact that the WD 22 hardware for the first RAT may not be required to follow any resource allocations or determine the presence of simultaneous transmissions on the second RAT. For the second RAT (where a more advanced hardware can be implemented), the WD 22 may use a smaller P_tot_lmit value (e.g., the first value) to limit the power for the second RAT (e.g., to control its overall out of band or spurious emissions) when there is a simultaneous transmission on the first RAT; however, when there is no simultaneous transmission the WD 22 may use a larger P_tot_lmit value (e.g., the second value). This may ensure that the WD 22 does not unnecessary reduce its power thereby improving overall system performance. In this embodiment, the first RAT can be LTE and the second RAT can be NR. In other embodiments, the first RAT and second RAT can be other types of access networks.

In some embodiments, the transmission on the first RAT can be a PUSCH, PUCCH, SRS transmission or a combination of these physical channels/signals. In other embodiments, the transmission on the first RAT can be other types of physical channels/signals.

In some embodiments, the transmission on the second RAT can be a PUSCH, PUCCH, SRS transmission or a combination of these physical channels/signals. In other embodiments, the transmission on the second RAT can be other types of physical channels/signals.

While the above embodiments discuss transmissions across different RATs, they can be applied for transmissions on different cell groups of the same RAT also by, for example, using procedures for a first CG in a RAT corresponding to procedures described above for first RAT, and by using procedures for a second CG in the RAT corresponding to procedures described above for second RAT.

One example for deriving A-MPR based on resource allocation for the WD 22 includes using the current formula in TS 36.101-3 (i.e., the carrier aggregation (CA) formula), as follows:
  i) P^ENDC_total=Power_class,EN-DC (23)—A-MPR,a (5)=(18) when there is simultaneous LTE and NR transmission, otherwise P  ENDC_total=Power_class, EN-DC
  ii) LTE is limited by P_LTE
    (1) There may be A-MPR,1 used on LTE side but A-MPR,1 just based on LTE resource allocation
    (2) Assume there is no NR transmission when computing LTE power i.e., P^ENDC_total=Power_class, EN-DC
    (3) Ltepowerreq=20
    (4) Ltepowerscaled=20
  iii) NR power is limited by P_NR
    (1) A-MPR,a is used for limiting NR power
    (2) Nrpowerreq=20
    (3) Nrpowerscaled=18
  iv) If LTE+NR power>P^ENDC_total; NR power is further reduced;
    (1) This operation may only occur on NR side so LTE need not know P^ENDC_total (i.e., it need not know NR resource allocation)
    (2) Ltepowerscaled+nrpowerscaled (20+18)> P^ENDC_total (18)
    (3) Finalltepower=20; finalnrpower=dropped.

Accordingly, the present disclosure provides for a WD 22 configured with dual-connectivity to at least two different RATs (e.g., LTE-NR/NR-LTE DC) determining a PHR report on the first RAT (e.g., LTE) considering the transmission on the first RAT and without considering the transmission on the second RAT. In some embodiments, the WD 22 determines a corresponding PHR report on the second RAT (e.g., NR), which may be different from the first RAT, considering transmissions on both the first and the second RAT.

Although the disclosure describes principles to be applied to the power headroom report, it should be understood that other types of power reports in multi-RAT connectivity environments may benefit from the principles of the disclosure.

In addition, one or more embodiments of the present disclosure may include one or more of the following, which may be implemented by WD 22 and/or network node 16.

In this disclosure, the discrepancy between RAN1 and RAN4 power-control decisions are observed and a resolution is proposed that does one or more of the following:
  not break the LTE timeline;
  not necessitate any A-MPR changes for existing band combinations; and/or
  not require any modification of the NR timeline (K1/K2).

The present disclosure also discusses an alternative should this not be acceptable.

Leaving aside different understandings of this discrepancy, it has been claimed that, in the EN-DC power control procedure, RAN1 has considered that 'NR' in the Type 1 UE modem [dynamic power scaling] knows about 'LTE' but not the other way around.

This is because the different timelines of LTE and NR.
  This resulted in the decision of not changing LTE power by RAN1 power control definition for
  Type 1 UEs
  This resulted in the decision of not supporting sTTI in EN-DC.

Indeed, when deriving the A-MPR for EN-DC, RAN4 assumed that a "NR" Type 1 UE modem knows both the 'LTE' and also the other way around despite the different CG timelines (LTE UL preparation can be significantly shorter that the 4 ms at least for non-CA). The motivation was that the required A-MPR if applied to the total signal (and same back-off on both CGs) is significantly smaller than that required if applied to each CG separately. Furthermore, the A-MPR specification (at least for the contiguous case) is based on an assumption that the TX PSD is the same on both (e.g., the same PL estimate and target received power on both CGs) but was assumed to hold also for slightly different PSDs on the two CGs as long as the total WD 22 power is not exceeded.

Regarding the timelines, there may be defined MPR/A-MPR definitions, which are made different set of assumptions, such as one or more of the following:
  'LTE side knows about NR side', even if NR UL grant arrives much later than LTE grant (e.g. much later than 4 ms before the LTE transmission);
  LTE PHR has a dependency on NR grant, even if NR UL grant arrives much later than LTE grant; and
  The RAN4 decisions require substantial changes in the LTE processing.

Figure 9:
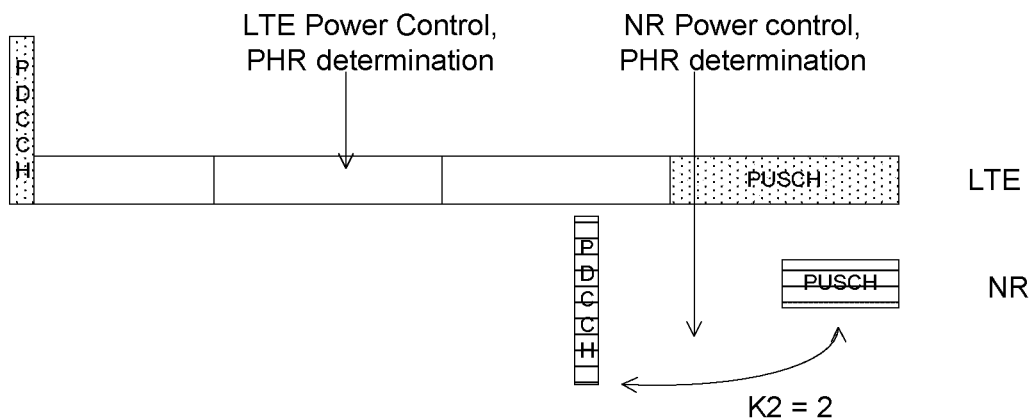
FIG. 9 illustrates an example of time division duplex (TDD) timing.
Figure 10:
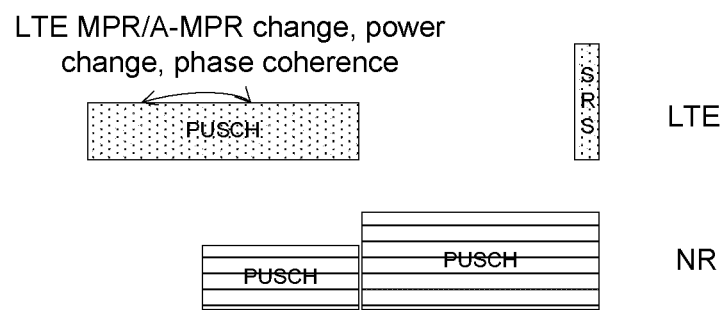
FIG. 10 illustrates an example of phase coherence.

For the TDD example with different numerologies, an example is shown in FIG. 9. FIG. 9 shows that the LTE side would adjust its gain setting (the A-MPR can in fact be obtained from the NR side since the same on both) and modify its PHR calculation after the NR UL_SG is received in the slot preceding the concurrent transmission. This may require a change to legacy LTE implementations. (The gain setting may have to be modified anyway even if static sharing is used.) Phase coherence at power changes is also addressed (an example is shown in FIG. 10) as a side note to propose aligned transmission boundaries for overlapping transmissions.

This issue is presumably only relevant for shared PAs. It is observed that for LTE, the power back-off in a subframe is allowed to be kept even if the power changes occur within the sub-frame (e.g., for piggy-backed SRS when the allocation changes). Similarly, for UL carrier aggregation (CA) the back-off on the total power can be kept even if the total power changes within the sub-frame. A similar provision for NR power reduction may alleviate the phase coherence problem.

Next, a resolution to the timeline problem for power control is described.

PHR Computation and CG Power Control with LTE and NR Timelines Maintained

It may be assumed that the A-MPR allowed for each CG is the same as the that specified for the total power (the $\hat{P}_{Total}^{EN-DC}$ in 38.213). This is similar to UL intra-band contiguous CA for LTE for which the A-MPR is the same on both (all) UL carriers and applied to the Pcmax,c calculation (and PHR) per carrier as well as to the total WD 22 power (Pcmax). The Pcmax,c calculation is not modified to account for the UL CA and that the total power is upper-bounded by Ppowerclass (23 dBm for PC3). This implies that the PHR calculated under the assumption that the total WD 22 power is available for each carrier, a basic assumption for CA. The UE power scaling on the two carriers should the total UE power be exceeded is not specified, it's up to implementation.

Applying the allowed A-MPR of the total UE power to both CGs indeed may mean that the PHR and the LTE gain setting may be modified much later than the LTE UL_SG (not the case for UL CA but the A-MPR on each CC must be adjusted). Now, for EN-DC the power scaling is specified unlike for UL CA; the NR power should be reduced. One could therefore allow the LTE CG to send its PHR as calculated in accordance with the LTE UL_SG only: the total power (as given by the LTE power class) is always available to LTE for the next TTI, which would only mean that the NR power would be downscaled or dropped. For the NR CG, the PHR can be calculated using the same A-MPR as that applied for limiting the total power $\hat{P}_{Total}^{EN-DC}$. This may also mean that the network node 16 (e.g., eNB/gNB) would be aware of the actual A-MPR applied on the $\hat{P}_{Total}^{EN-DC}$ and the NR CG since the Pcmax is always available in the NR PHR. Moreover, the network node 16 (e.g., eNB/gNB) is also aware of the maximum power capability (class) of both CGs and the total EN-DC signal from the UE capability. This may solve the LTE timeline issue and the PHR determination on the LTE CG.

For UE supporting dynamic power sharing, the resolution above means that:
1. the PRB allocation on the LTE CG (MCG) is known to the NR CG (SCG), but the PRB allocation on the SCG is not necessarily known to the MCG
2. the A-MPR for the total UE power $\hat{P}_{Total}^{EN-DC}$ is determined by the PRB allocations on both CGs and the UL power is limited by the Ppowerclass,EN-DC and cell-specific P-Max,EN-DC (if specified)
3. the A-MPR on the MCG is determined by the PRB allocation on the MCG only and the UL power is limited by the Ppowerclass,MCG, the cell-specific P-Max and the dedicated P_LTE (if present)
4. the A-MPR on the SCG is the same as that for the total power $\hat{P}_{Total}^{EN-DC}$ and limited by the Ppowerclass, MCG and the cell-specific P-Max and the dedicated P_LTE if present Hence the A-MPR for the SCG work like for UL CA for LTE: the A-MPR is the same as for the aggregate signal and the maximum power on the SCG as governed by the NR power class is the same regardless of the presence of another carrier (CG).

For PHR reporting (including extended reporting for LTE):
1. the PHR on the MCG is determined by the PRB allocation of the MCG as indicated in the LTE UL_SG (signalling grant) in accordance with LTE UL timing;
2. the PHR on the SCG is determined by the allocation of both CG (hence the A-MPR for the total UE power) based on the NR UL_SG accordance with NR UL timing and (internal UE) information about the MCG allocation from the LTE UL_SG arriving earlier.

Figure 11:
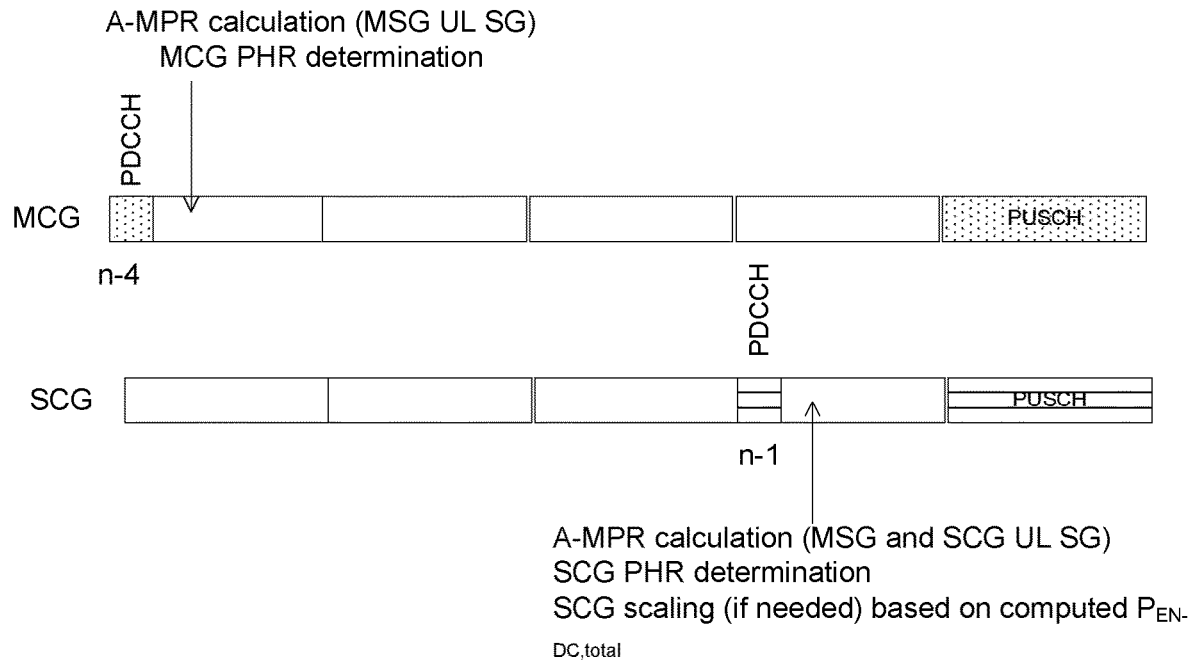
FIG. 11 illustrates an example of configuration for keeping the LTE timeline and avoiding A-MPR changes for existing band combinations.

A resolution to the timeline issue is illustrated in FIG. 11. The NR power scaling may not necessarily imply any adjustment of the LTE power (cannot be rules out even for static sharing).

It is also observed that the NR timeline is maintained: there is no need to modify the K1/K2 for the purpose of power control.

The behavior of a UE (e.g., WD 22) operating in accordance with FIG. 11 may in fact not be very much different from that of a UE applying power back-off on both CGs (the current RAN4 assumption). An example: suppose that the A-MPR of the total UE power is A-MPR_tot=A-MPR_SCG=5 dB and the A-MPR on the MCG is A-MPR_MCG=0 dB for a UE with $P_{powerclass,EN-DC}$= $P_{powerclass,MCG}$=$P_{powerclass,SCG}$=23 dBm (we set MPR=0 dB for simplicity). Thus $\hat{P}_{Total}^{EN-DC}$=18 dBm assuming that the entire A-MPR allowance is needed. Suppose also that the calculated P_MCG=20 dBm, which means that the NR signal will be dropped. Now, it would not help much is the LTE power can be reduced in accordance with the A-MPR, then the total power can be reduced to 18 dBm—the NR CG would still be dropped. In either case the LTE CG can be increased in accordance with the LTE power calculation (up to 23 dBm) once the NR signal is dropped.

Figure 12:
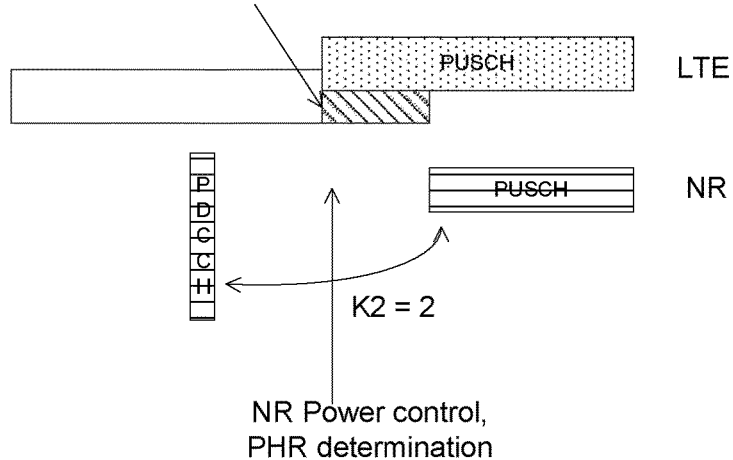
FIG. 12 illustrates an example of a timeline problem with mixed numerologies.

Another example of the timeline issue is shown in FIG. 12 for a case with mixed numerology, tight NR timeline and a power change within a subframe (1 ms). Now, using the resolution above, the LTE power is determined independent of the NR power in accordance with the LTE timeline, the LTE UL_SG is known (n−4) to the NR CG for calculation of the A-MPR needed for power scaling and NR CG power control. For the A-MPR with mixed numerologies, one could make the provision that the power back-off can be allowed to be constant for the duration of the (LTE) subframe, which would avoid the issues with power changes within a sub-frame shown in FIG. 10. At any rate, this issue is relevant for a shared PA used for intra-band contiguous EN-DC with its small MRTD (co-sited) for which a mixed numerology implementation is less likely.

An Alternative: Power Back-Off on NR Only

If the resolution above is not acceptable, then another embodiment may be to apply the back-off on the NR CG only while assuming that the LTE is "untouched" with a power calculated assuming absence of the NR CG (same back-off as for single carrier). In practice this means that the LTE power is near maximum since the allowed power-backoff may be limited to MPR for the existing band combinations (LTE at 22 dBm). Specifying of the A-MPR may be awkward since a specification of A-MPR tables depending on different LTE power (as set by P_LTE) may not be feasible. Actually, the resolution above also leaves the LTE "untouched" without the need for changing the NR A-MPR already specified.

Reiterating the A-MPR for a concurrent NR CG would imply substantial power back-off on the NR CR since inter-modulation products would violate the emission limits. Moreover, $P_{EN-DC,total}$=10 $\log_{10}(\hat{P}_{Total}^{EN-DC})$= $P_{powerclass,EN-DC}$ for there is no back-off allowed on the $\hat{P}_{Total}^{EN-DC}$ based on the allocation on both CGs, the actual PRB allocation is not assumed to be known to the NR side.

Next, the required NR power back-off for DC_(n)71B combination may also be considered. It may be assumed that a UE architecture with a single PA configured for 23 dBm total output power (meets the LTE requirements at 22 dBm) and combination of the CG in the baseband follow by a common up-conversion (hence only one LO). We consider a 10+10 MHz channel bandwidth combination with the LTE UL at 693 MHz and the NR at 683 MHz. The Band 71 duplex filter is assumed to provide an attenuation of X=10 dB across Band 29 (25 dB across Band 12), the Band 29 protection requirement is −38 dBm/MHz.

Figure 13:
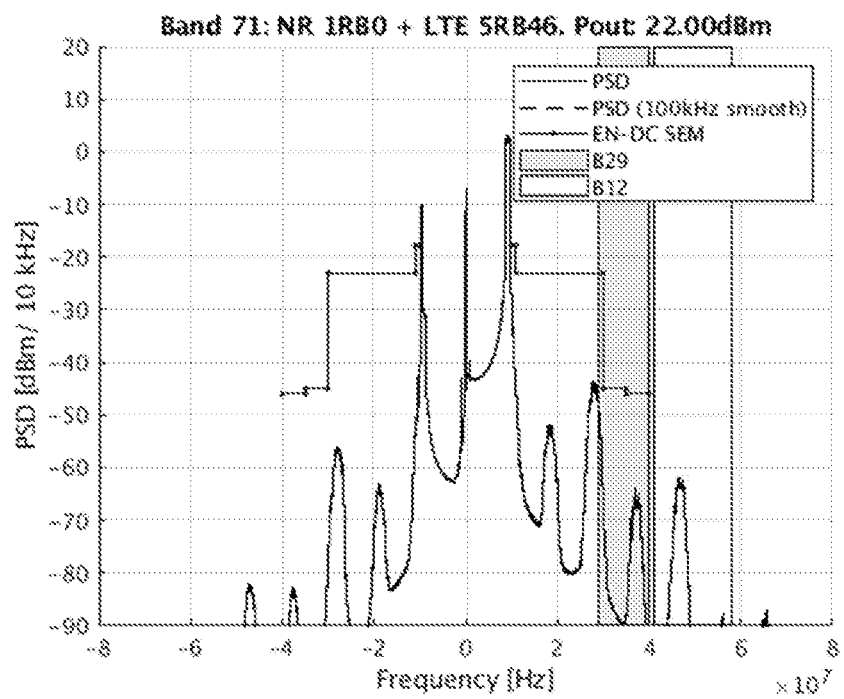
FIG. 13 illustrates an example of emissions with LTE UL at 693 MHz and the NR at 683 MHz, IM3 falls into Band 29 (P_MCG=22 dBm)

FIG. 13 shows the output spectrum for a case with LTE power P_MCG=22 dBm (MPR=1 dB) and an allocation of 1 resource block (RB) at the lower NR edge and 5 RB at the upper LTE edge; IM3 may then just about leak into Band 29. In this case the NR power may be reduced to 2 dBm, i.e. a 21 dB power back-off. The Band 29 emissions requirement is dimension. Assuming a P_MCG=22 dBm (no MPR) would not allow any NR transmissions.

Figure 14:
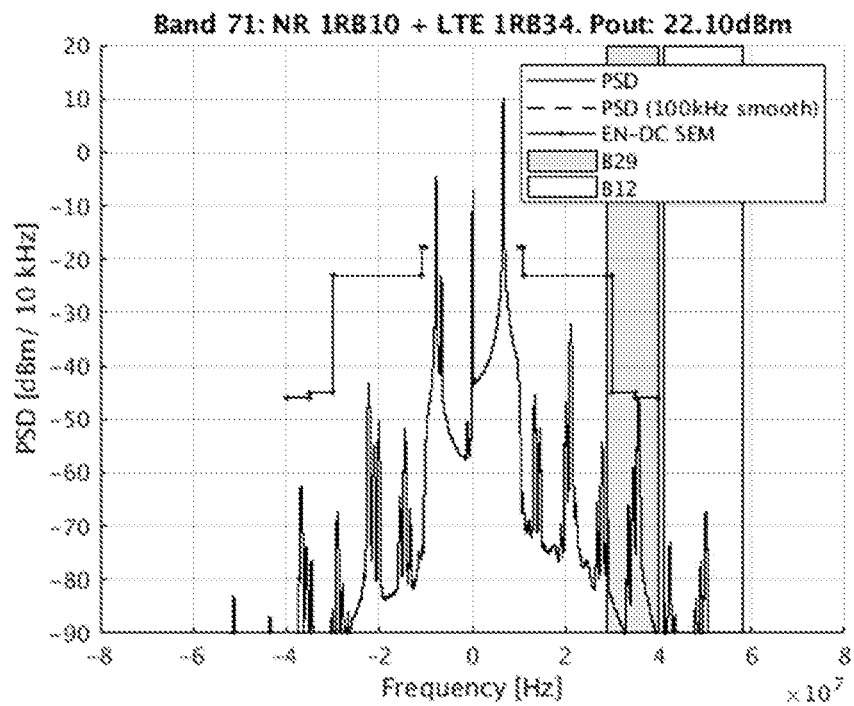
FIG. 14 illustrates an example of emissions with LTE UL at 693 MHz and the NR at 683 MHz, IM5 falls into Band 29 (P_MCG=22 dBm)

FIG. 14 shows a 1RB (682 MHz)+1RB (696 MHz) such that IM5 falls into Band 29. Then the NR power may be reduced to 7.3 dBm (15.7 dB back-off) at P_MCG=22 dBm.

In practice, specifying A-MPR exceeding 15 dB may not be feasible. The results herein indicate that adoption of the way forward may imply that the NR CG is dropped under many circumstances if not all.

Figure 15:
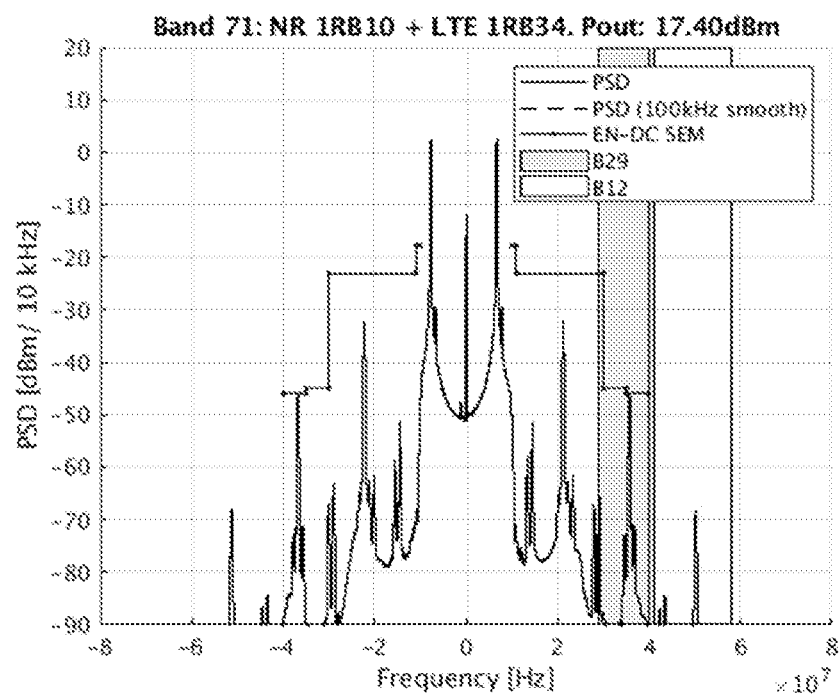
FIG. 15 illustrates an example of emissions with LTE UL at 693 MHz and the NR at 683 MHz with back-off applied on the total UE power.

It is interesting to compare to a case in the total UE power is reduced in accordance with the existing A-MPR specification with this power back-off also applied to the NR CG in accordance with Section (hence assuming that equal or near equal TX PSD on both CGs). FIG. 15 shows the result with the same conditions as are those assumed for FIG. 14. The back-off is now reduced to 5.6 dB. Hence a reduction of 10 dB. The back-off can be reduced even further as discussed below.

Reducing Power Back-Off for the Intra-Band Cases DC_(n)71 and DC_41_n41

The allowed A-MPR specified for DC_(n)71 and DC_41_n41, or at least the actual power reduction, can be reduced further if more typical values of the Band 71 duplex-filter attenuation would be used, by recognizing that the Band 71 SEM is much tighter than the regulatory requirement and that the PA mode of operation could be changed for DC_41_n41 when the UE is configured for EN-DC.

Figure 16:
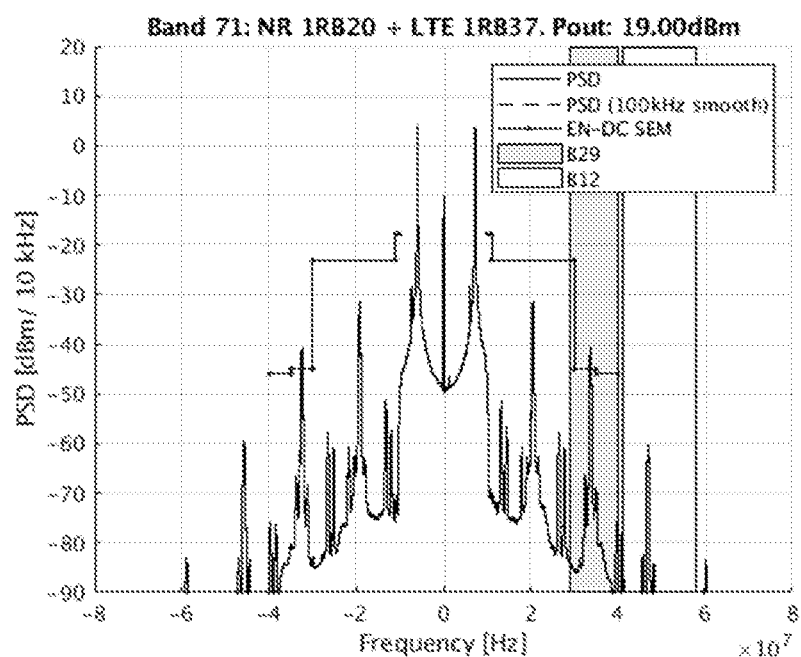
FIG. 16 illustrates an example of emissions with LTE UL at 693 MHz and the NR at 683 MHz with increased fduplex-filter attenuation across Band 29.

FIG. 16 shows results with the same setup as that assumed for the results in FIG. 15 but with the Band/1 duplex attenuation across Band 29 increased by 5 dB to X=15 dB. Then the back-off on the NR CG is further reduced to 4.0 dB. The −25 dBm/MHz (far-out) EN-DC SEM requirement is now dimensioning.

The same exercise, i.e. increasing the duplex-filter attenuation to X=15 dB, for the case shown in FIG. 14 leads to a reduction of the NR CG back-off from 15.7 dB to 14.5 dB, the SEM limiting.

The DC_(n)71B SEM could actually be relaxed and still be within regulatory limits (−13 kHz/100 kHz), coexistence is facilitated by the ACLR that would be maintained.

For DC_41_n41 simulations are more difficult. Measured results are available to this end. These results indicate that the power back-off is only necessary when the two PAs (one per CG) are configured for envelope tracking (ET), no back-off is required if they are configured for average-power tracking (APT).

In this disclosure, a resolution of the timeline and PHR issues are proposed, which may:
not break the LTE timeline;
not necessitate any A-MPR changes for existing band combinations; and/or
not require any modification of the NR timeline (K1/K2).

With regard to some proposals, it should be noted that the UE may not be expected to update LTE PHR report if the LTE reporting timeline is not met, e.g., UE may not need to include in the PHR determination any information received later than 4 ms prior to the PHR reference UL subframe in the case of LTE FDD, or later than the associated DL control in the TDD HARQ timeline in the case of LTE TDD. In some embodiments, use of a constant power backoff within a sub-frame could be allowed for synchronized EN-DC (provision relevant for shared PA).

The allowed A-MPR specified for DC_(n)71 and DC_41_n41, or at least the actual power reduction, can be reduced further if more typical values of the Band 71 duplex-filter attenuation would be used, by recognizing that the Band 71 SEM is much tighter than the regulatory requirement, and that the APT PA operating mode would allow dual UL operation at significantly smaller (no) power reduction for DC_41_n41.

The discrepancy between RAN1 and RAN4 power-control decisions are observed and a resolution is proposed that does one or more of the following:
not break the LTE timeline
not necessitate any A-MPR changes for existing band combinations
not require any modification of the NR timeline (K1/K2)

Some embodiments propose to use this resolution for the specification of the configured output power for EN-DC, which includes the configuration of the total UE power (the $\hat{P}_{Total}^{EN-DC}$ specified in the 38.213) and the configured output power for the CGs when any different to that specified in the standalone specifications 36.101 and 38.101-1. The $\hat{P}_{Total}^{EN-DC}$, the "Pcmax per UE", determines the UE behavior in 38.213. Its limits are to be specified in 38.101-3, but not any UE behavior.

It may be assumed that the power classes of each CG as well as the EN-DC power class are available to the network node 16 (e.g., eNB/gNB) by UE (e.g., WD 22) capability indication. The way forward for the EN-DC power class may be:
Power Class for FR1 EN-DC and NR CA mode need to be signaled as UE capability; and/or
Power Class for FR1 EN-DC and NR CA is per band combination capability.

In EN-DC, the MCG (eNB) is primarily responsibility for handling the UE capabilities (fetch them from CN and/or UE). The MN then forwards the UE capabilities to the SN if/when it decides to configure EN-DC. A common container for the EN-DC capabilities, i.e., those things that are only relevant if the two RATs are used in combination. Hence, the power classes for LTE and NR may be known to the network when EN-DC is configured. Any change of the power capability of LTE/NR when EN-DC is configured would have to be indicated.

The present disclosure also discusses the verification of the EN-DC maximum power for conformance. For LTE, the P_LTE is part of the RRC Connection Reconfiguration IE in 36.331 that is only relevant when the UE is configured with EN-DC. The modification of the Pcmax on the MCG may therefore be specified in the 38.101-3.

For NR, the P_NR is part of the CellGroupConfig IE in 38.331 that applies for DC in general. This can be configured for each CG when the UE is configured for NR DC. However, for EN-DC there is only one CG whereas the NR DC involves at least two CGs. Therefore, the modification of the Pcmax on the SCG may therefore be specified both in the 38.101-1 and in the 38.101-3.

Configured Maximum Output Power Level

Different Power Sharing Capability

The PC loops for the two CGs are "independent", see discussion in [1], but either static or dynamic "power scaling" must be applied to limit the total UE power $\hat{P}_{Total}^{EN-DC}$. The P_NR and P_LTE in the inequality $\hat{P}_{LTE}$+$\hat{P}_{NR}$>$\hat{P}_{Total}^{EN-DC}$ in 38.213 are relevant for making sure the total UE power is limited such that SAR and unwanted emissions requirements are not violated for devices not supporting power sharing ensuring a minimum power on the (downscaled) SCG for devices supporting power sharing.

The specification of the limits should depend on the power sharing capability such that the eNB/gNB can configure the P_LTE and P_NR appropriately.

1. For UEs supporting dynamic power sharing, the can be slot-dependent with an A-MPR (back-off of total power) accounting for the PRB allocations on both CGs. The limit of $\hat{P}_{Total}^{EN-DC}$ is then specified as a range similar to the Pcmax for each CG.
2. For UEs not supporting dynamic power sharing, the $\hat{P}_{Total}^{EN-DC}$ should be constant for it would be difficult for the eNB/gNB configure the semi-static P_LTE and P_NR limits necessary for static power sharing based on a slot-dependent $\hat{P}_{Total}^{EN-DC}$.

The above applies for all types of EN-DC band combinations (within FR1).

CG Power Control: A-MPR, PH Reporting and CG Timing

The independent power-control (PC) loops of the two CGs can be operated in accordance with the respective power class, Ppowerclass,MCG for LTE and Ppowerclass, SCG for NR. These power classes also apply for transmission on the CGs when the UE is configured for single-TX transmissions. The Ppowerclass,EN-DC is the power capability for concurrent TX and governs the total UE power $\hat{P}_{Total}^{EN-DC}$.

For UEs supporting dynamic power sharing for inter-band EN-DC combinations, one or more of the following assumptions for concurrent transmissions may be made:

1. the PRB allocation on the LTE CG (MCG) is known to the NR CG (SCG), but the PRB allocation on the SCG is not necessarily known to the MCG;
2. the A-MPR for the total UE power $\hat{P}_{Total}^{EN-DC}$ is determined by the PRB allocations on both CGs and the UL power is limited by the Ppowerclass,EN-DC and cell-specific P-Max,EN-DC (if specified);
3. the A-MPR on the MCG is determined by the PRB allocation on the MCG only and the UL power is limited by the Ppowerclass,MCG, the cell-specific P-Max and the dedicated P_LTE (if present); and/or
4. the A-MPR on the SCG is the same as that for the total power $\hat{P}_{Total}^{EN-DC}$ and limited by the Ppowerclass, MCG and the cell-specific P-Max and the dedicated P_LTE if present;

Hence, the A-MPR for the SCG may work similar for UL CA for LTE: the A-MPR is the same as for the aggregate signal and the maximum power on the SCG as governed by the NR power class is the same regardless of the presence of another carrier (CG).

For PH reporting (including extended reporting for LTE):

1. the PHR on the MCG is determined by the PRB allocation of the MCG as indicated in the LTE UL_SG (signalling grant) in accordance with LTE UL timing; and/or
2. the PHR on the SCG is determined by the allocation of both CG (hence the A-MPR for the total UE power)

based on the NR UL_SG accordance with NR UL timing and (internal UE) information about the MCG allocation from the LTE UL_SG arriving earlier.

In some embodiments, this may indicate that the PHR on the MCG does not account for the SCG allocation. However, for EN-DC the eNB/gNB can always allocate the LTE (MCG) up to the entire UE power as indicated by the MCG PHR, but then the NR CG may be dropped in accordance with the dynamic power sharing rules in 38.213. The PHR on the SCG also accounts for the MCG allocation (the same A-MPR as that allowed for $\hat{P}_{Total}^{EN-DC}$), which provide information to the network node 16 (e.g., gNB) on the power that could possibly be allocated to the SCG before any NR downscaling can occur in the presence of the MCG. This may also make the gNB aware of the actual power used on the SCG and the power back-off allowed for the total UE power (since Pcmax,c with its implicit back-off information is always reported in the PHR for NR).

For the dynamic power sharing, all calculations can be carried out on the SCG; the total power $\hat{P}_{Total}^{EN-DC}$ is determined and the NR power is downscaled if the measured total power UE exceeds $\hat{P}_{Total}^{EN-DC}$. The measurement of the actual power includes the MCG power as determined by the LTE PC loop.

The behavior of a UE (e.g., WD 22) operating according to the assumption above may not be very different from that of a UE following the current RAN4 assumptions (that the allocations on the SCG are also known to the MCG).

It may be noted that the above assumptions imply that the existing A-MPR specification for intra-band EN-DC can be kept and the concerns on the CG timing are addressed. Moreover, there is no limitation on the NR timing other than that already stated in 38.213 (e.g., no sTTI on the MCG).

The above discussion is relevant for the intra-band EN-DC combinations for which the unwanted emissions are dependent on the allocations on both CGs. This is not normally the case for inter-band EN-DC combinations, but the total power may be scaled nevertheless.

Pcmax for EN-DC Band Combinations

Intra-Band Contiguous EN-DC

In some embodiments, let $P_{EN-DC,total}=10\log_{10}(\hat{P}_{Total}^{EN-DC})$ denote the total UE power in logarithmic scale. For UE (e.g., WD 22) not supporting dynamic power sharing, the power on the MCG and SCG may be decoupled and the total output power may only be configured as $$P_{EN-DC,total}=P_{powerclass,EN-DC}$$

Should the $P_{EN-DC,total}$ be slot dependent, then the lowest possible $P_{EN-DC,total}$ may have to be assumed by the BS leading to severely restricted P_LTE and P_NR unless A-MPR is zero. The A-MPR of the MCG and the SCG are determined by the respective (own) PRB allocation and an assumption of the worst-case allocation on the other CG as specified e.g., for DC_(n)71. The timing of the LTE CG may not be affected since the actual allocation of the NR CG is not considered.

The formulae for determining the Pcmax of the CGs may be amended in 38.101-3 to include the P_LTE and P_NR.

For PC3 operation the evaluation of the inequality $\hat{P}_{LTE}$+$\hat{P}_{NR}$>$\hat{P}_{Total}^{EN-DC}$ in linear scale implies that SCG slots are dropped when the UE is configured with a 20 dBm equal power split between the CG. To this end the $P_{EN-DC,total}$ may be modified as follows, $$P_{EN-DC,total}=P_{powerclass,EN-DC}+0.3,$$

picking 0.3 dB as the smallest fractional dB value used. In this way the nominal value of $P_{powerclass,EN-DC}$ for PC3 operation does not have to exceed 23 dBm, which would be a problem in some regions. The tolerances are modified such that the limits of the measured total power are maintained.

For UE supporting power sharing, the total power $P_{EN-DC,total}$ can be configured on a slot basis in the range $$P_{EN-DC,total\_L} < P_{EN-DC,total} < P_{EN-DC,total\_H}$$

where $$P_{EN-DC,total\_L} = \text{MIN}\{P_{PowerClass,EN-DC}\text{-MAX}(A\text{-MPR}, P\text{-MPR}), P_{EMAX,EN-DC}\}$$

$$P_{EN-DC,total\_H} = \text{MIN}\{P_{PowerClass,EN-DC}, P_{EMAX,EN-DC}\},$$

where A-MPR is the allowed back-off of the total power. With the CG(s) are indexed by j=1 for MCG and j=2 for SCG and cells by c(j), the $A\text{-MPR}_{c(1)} = A\text{-MPR}_1$ and $A\text{-MPR}_{c(2)} = A\text{-MPR}$, where the $A\text{-MPR}_1$ is determined from the UL_SG on the MCG only (the expressions for $P_{EN-DC,total\_L}$ and $P_{EN-DC,total\_H}$ are simplified to show the general principle). The $P_{EMAX,EN-DC}$ is the limitation on the total EN-DC power proposed.

Intra-Band Non-Contiguous EN-DC

The intra-band non-contiguous EN-DC case may be specified like the contiguous case.

Inter-Band EN-DC within FR1

For UEs (e.g., WD 22) not supporting dynamic power sharing, $$P_{EN-DC,total} = P_{powerclass,EN-DC} + 0.3$$

just as for the above intra-band cases.

For inter-band EN-DC the power back-off on the CG required to meet the unwanted emissions requirements are normally independent, which simplifies the A-MPR specification. The A-MPR on each CG can be determined in accordance with the UL_SG on the respective CG, hence accounting only for the PRB allocations on each CG. There is no UL timing issue with respect to the A-MPR determination.

For UEs supporting dynamic power sharing, the total power $P_{EN-DC,total}$ can be configured on a slot basis in the range $$P_{EN-DC,total\_L} < P_{EN-DC,total} < P_{EN-DC,total\_H}$$

where the limits are the sum of the lower and upper limits for the CGs.

$$P_{EN-DC,total\_L} = \text{MIN}\{10 \log_{10}(p_{CMAX\_L,MCG} + p_{CMAX\_L,SCG}), P_{PowerClass,EN-DC}, P_{EMAX,EN-DC}\}$$

$$P_{EN-DC,total\_H} = \text{MIN}\{10 \log_{10}(p_{CMAX\_H,MCG} + p_{CMAX\_H,SCG}), P_{PowerClass,EN-DC}, P_{EMAX,EN-DC}\}$$

with $p_{CMAX\_L,MCG} = p_{CMAX\_L,c(1)}$ and $p_{CMAX\_L,MCG} = p_{CMAX\_L,c(2),f}$ for cell c(j) of CG j as specified for subframe $i_1$ in [36.101] and slot $i_2$ in [38.101-1], respectively. The above expression depends on the sub-frame/slot pair $(i_1, i_2)$.

Inter-Band EN-DC Including FR2

For inter-band EN-DC including FR2 operating bands, the current understanding is that the configured power on the two CG can be set independently. However, the SAR and MPE requirements cannot be exceeded simultaneously. At this time, the Pcmax may be tentatively specified as: the configured maximum output power on the MCG and SCG is in accordance with 36.101 and 38.101-2, respectively.

The Measured Configured Output Power

The configured output power $\hat{P}_{Total}^{EN-DC}$ is calculated internally in the UE (e.g., WD 22). This power is verified by measurements at the antenna ports (FR1) and yields the "Pumax". Just like for the configured power, the Pcmax may be different for devices not supporting dynamic power sharing.

For all EN-DC cases the measured total maximum output power $P_{UMAX}$ over both CGs can be expressed as $$P_{UMAX} = 10 \log_{10}[p_{UMAX,c(1)} + p_{UMAX,c(2)}],$$

where $p_{UMAX,c(i)}$ denotes the measured output power of serving cell c) of CG j expressed in linear scale. For UEs not indicating support of dynamic power sharing $P_{UMAX} \leq \text{MIN}\{P_{PowerClass,EN-DC}, P_{EMAX,EN-DC}\} + T(\text{MIN}\{P_{PowerClass,EN-DC}, P_{EMAX,EN-DC}\}) - 0.3$
while for UEs indicating support of dynamic power sharing the range is slot/sub-frame dependent.

$$P_{EN-DC,total\_L}(i_1,i_2) - T(P_{EN-DC,total\_L}(i_1,i_2)) \leq P_{UMAX} \leq P_{EN-DC,total\_H}(i_1,i_2) + T(P_{EN-DC,total\_H}(i_1,i_2))$$

where T(P) is the power tolerance for applicable power levels P (the argument in the expressions above) in dBm.

For inter-band EN-DC the configured output power should also cover the case of asynchronous operation and the case of different SCS on the two CG, which implies that the "evaluation period" of $\hat{P}_{Total}^{EN-DC}$ during overlapping subframes $i_1$ and slots $i_2$ must be adopted also for the Pumax measurement.

How to Test EN-DC Configured Power for Conformance

The configured output power is normally verified by sending a sequence of power "UP" commands until the output power no longer increases at the maximum power capability. Repeating this for EN-DC by sending "UP" commands on both CGs may not be obvious for then the UE will downscale the NR CG when the total UE power is exceeded. Instead, for EN-DC, the maximum output power for dual UL could be measured by sending "UP" commands until the NR CG reaches its maximum after which downscaling occurs. This is admittedly a more complex procedure.

The following section may include a summary of changes that may be made to a technical specification according to some embodiments of the present disclosure.

The configured output power (calculated) is specified for EN-DC. For band combinations within FR1 the specification depends on the support of dynamic power sharing. For combinations including FR2 bands the specification is tentative (with the assumption that power sharing is performed).

Clause 6.2B.4.1.1 (intra-band contiguous): the configured maximum power is specified with the LTE timeline for UL transmissions (power back-off and PHR determination) maintained according to Rel-8.

Clause 6.2B.4.1.2 (intra-band non-contiguous): the configured maximum power is specified as for the intra-band contiguous case but with parameters relevant for intra-band non-contiguous combinations. For TDD combinations and power class 2 operation, duty-cycle restrictions are specified.

The configured output power for each CG (power back-off on the CG) is specified as a modification to the corresponding specification TS 36.101 (MCG) and TS 38.101-1 (SCG) including the respective semi-static power limits P_LTE and P_NR and the applicable power back-off per CG. P_NR can also be specified for NR DC (stand-alone) but for EN-DC only one secondary cell group is used so relevant to include the P_NR limitation also in 38.101-3.

Clause 6.2B.4.1.3 (inter-band): the configured maximum power is specified with the assumptions that the allowed power reductions on the CGs are independent and that each can be specified as that applicable in the absence of the other CG.

The configured output power for single UL transmissions is specified for all cases above.

Clause 6.2B.4.1.4 (inter-band including FR2): the configured maximum power is tentatively specified with the assumptions that power sharing can managed by the power management P-MPR (pending agreements by RAN4).

The tolerances for the measured output power is put TBD in this version of the CR. The evaluation of the maximum power for inter-band combinations with different sub-carrier spacing is also put TBD.

The following section may represent an example technical specification according to one or more embodiments of the present disclosure.

1.1.1 Configured Output Power for EN-DC
1.1.1.1 6.2B.4.1 Configured Maximum Output Power Level
1.1.1.1.1 6.2B.4.1.1 Intra-Band Contiguous EN-DC The following requirements apply for one component carrier per CG configured for synchronous DC. The CG(s) are indexed by j=1 for MCG and j=2 for SCG.

If the UE is configured with single UL transmission, the configured maximum UE power for sub-frame $i_1$ on CG 1 shall be in accordance with sub-clause 6.2.5 of [36.101] whereas the configured maximum UE power for slot $i_2$ on CG 2 shall be in accordance with sub-clause 6.2.4 of [38.101-1].

For UEs not indicating support of dynamicPowerSharing in the UE-MRDC-Capability IE the total configured output power is $$P_{EN\text{-}DC,tot}=10\log_{10}(\hat{P}_{Total}^{EN\text{-}DC})=P_{powerclass,EN\text{-}DC}+0.3 \text{ [dBm]}$$

where $P_{powerclass,EN\text{-}DC}$ is the EN-DC power class of the intra-band contiguous band combination configured and $\hat{P}_{Total}^{EN\text{-}DC}$ as specified in sub-clause 7.6 of [38.213].

For UEs indicating support of dynamicPowerSharing in the UE-MRDC-Capability IE the UE can configure the total output power within the range $$P_{EN\text{-}DC,tot\_L} < P_{EN\text{-}DC,tot} < P_{EN\text{-}DC,tot\_H}$$

where $$P_{EN\text{-}DC,tot\_L}(i_1,i_2)=\text{MIN}\{P_{PowerClass,EN\text{-}DC}-A\text{-MPR}, P_{EMAX,EN\text{-}DC}\}$$

$$P_{EN\text{-}DC,tot\_H}(i_1,i_2)=\text{MIN}\{P_{PowerClass,EN\text{-}DC}, P_{EMAX,EN\text{-}DC}\}$$

for sub-frame $i_1$ on CG 1 overlapping with slot $i_2$ on CG 2 with $P_{EMAX,EN\text{-}DC}$ is the [P-Max for EN-DC] and A-MPR in accordance with sub-clause 6.2B.3.1.

The configured maximum output power $P_{CMAX,c}$ for serving cell c=c(1) of CG 1 (MCG) is set in accordance with sub-clause 6.2.5 of [36.101] with the limits replaced by $$P_{CMAX\_L,c}=\text{MIN}\{\text{MIN}(P_{EMAX,c},P_{LTE})-\Box T_{C,c}, (P_{PowerClass}-\Delta P_{PowerClass})-\text{MAX}(\text{MPR}_c+A\text{-}\text{MPR}_c+\Delta T_{IB,c}+\Box T_{C,c}+\Box T_{ProSe},P\text{-MPR}_c)\}$$

$$P_{CMAX\_H,c}=\text{MIN}\{P_{EMAX,c},P_{LTE},P_{PowerClass}-\Delta P_{PowerClass}\}$$

where
$P_{LTE}$ is the value indicated by the IE p-MaxEUTRA-r15 [36.331] in the RRC Connection Reconfiguration when the serving cell c belongs to a cell group configured with EN-DC for a UE supporting EN-DC;

$P_{PowerClass}$ is the maximum UE power on the CG 1 as specified in sub-clause 6.2.2 in [36.101];

for a UE indicating support of dynamicPowerSharing, the A-MPR$_c$ is determined in accordance with the DCI of serving cell c of the CG 1 and the specification in sub-clause 6.2.4 of [36.101];

for a UE not indicating support of dynamicPowerSharing, the A-MPR$_c$ is determined in accordance with sub-clause 6.2B.3.1 with parameters applicable for UEs not indicating support of dynamicPowerSharing and MPR$_c$=0 dB;

The configured maximum output power $P_{CMAX,c,f}$ for serving cell c=c(2) with frequency f on CG 1 (SCG) is set in accordance with sub-clause 6.2.4 of [38.101-1] with the limits replaced by $$P_{CMAX\_L,f,c}=\text{MIN}\{\text{MIN}(P_{EMAX,c},P_{NR})-\Delta T_{C,c}, (P_{PowerClass}-\Delta P_{PowerClass})-\text{MAX}(\text{MPR}_c+A\text{-}\text{MPR}_c+\Delta T_{IB,c}+\Delta T_{C,c}+\Delta T_{RxSRS},P\text{-MPR}_c)\}$$

$$P_{CMAX\_H,f,c}=\text{MIN}\{P_{EMAX,c},P_{NR},P_{PowerClass}-\Delta P_{PowerClass}\}$$

where
$P_{NR}$ is the value given by the IE p-NR in the CellGroupConfig IE [38.331] when the serving cell c belongs to a cell group configured with EN-DC for a UE supporting EN-DC;

$P_{PowerClass}$ is the maximum UE power on the CG 2 as specified in sub-clause 6.2.1 in [38.101-1];

for a UE indicating support of dynamicPowerSharing, A-MPR$_c$=A-MPR with A-MPR determined in accordance with sub-clause 6.2B.3.1 and MPR$_c$=0 dB;

for a UE not indicating support of dynamicPowerSharing, the A-MPR$_c$ is determined in accordance with sub-clause 6.2B.3.1 with parameters applicable for UEs not indicating support of dynamicPowerSharing and MPR$_c$=0 dB;

The measured total maximum output power $P_{UMAX}$ over both CGs is $$P_{UMAX}=10\log_{10}[p_{UMAX,c(1)}+p_{UMAX,c(2)}],$$

where $p_{UMAX,c(j)}$ denotes the measured output power of serving cell c(j) of CG j expressed in linear scale. For UEs indicating support of dynamicPowerSharing in the UE-MRDC-Capability IE $$P_{UMAX} \leq \text{MIN}\{P_{PowerClass,EN\text{-}DC},P_{EMAX,EN\text{-}DC}\}+T(\text{MIN}\{P_{PowerClass,EN\text{-}DC},P_{EMAX,EN\text{-}DC}\})$$

while for UEs indicating support of dynamicPowerSharing $$P_{EN\text{-}DC,tot\_L}(i_1,i_2)-T(P_{EN\text{-}DC,tot\_L}(i_1,i_2)) \leq P_{UMAX} \leq P_{EN\text{-}DC,tot\_H}(i_1,i_2)+T(P_{EN\text{-}DC,tot\_H}(i_1,i_2))$$

where the tolerance T(P) for applicable power levels P is specified in Table 6.2B.4.1.1-1.

TABLE 6.2B.4.1.1-1

Configured maximum output power tolerance for EN-DC

| P (dBm) | Tolerance T(P) (dB) |
| --- | --- |
| 23 < P ≤ 33 | TBD |
| 21 ≤ P ≤ 23 | TBD |
| 20 ≤ P < 21 | TBD |
| 19 ≤ P < 20 | TBD |
| 18 ≤ P < 19 | TBD |

TABLE 6.2B.4.1.1-1-continued

Configured maximum output
power tolerance for EN-DC

| P (dBm) | Tolerance T(P) (dB) |
|---|---|
| 13 ≤ P < 18 | TBD |
| 8 ≤ P < 13 | TBD |
| −40 ≤ P < 8 | TBD |

1.1.1.1.2 6.2B.4.1.2 Intra-Band Non-Contiguous EN-DC

The following requirements apply for one component carrier per CG configured for synchronous DC. The CG(s) are indexed by j=1 for MCG and j=2 for SCG.

If the UE is configured with single UL transmission, the configured maximum UE power for sub-frame $i_1$ on GC 1 shall be in accordance with sub-clause 6.2.5 of [36.101] whereas the configured maximum UE power for slot $i_2$ on GC 2 shall be in accordance with sub-clause 6.2.4 of [38.101-1].

For UEs not indicating support of dynamicPowerSharing in the UE-MRDC-Capability IE, the total configured output power is determined in accordance with sub-clause 6.2B.4.1.1 but with $P_{powerclass,EN-DC}$ the EN-DC power class of the intra-band non-contiguous band combination configured.

For UEs indicating support of dynamicPowerSharing in the UE-MRDC-Capability IE, the UE can configure the total output power in accordance with sub-clause 6.2B.4.1.1 but with $P_{powerclass,EN-DC}$ the EN-DC power class of the intra-band non-contiguous band combination configured and A-MPR determined in accordance with sub-clause 6.2B.3.2

The configured maximum output power $P_{CMAX,c}$ for serving cell c=c(1) of CG 1 (MCG) is set in accordance with sub-clause 6.2B.4.1.1 but where
- for a UE not indicating support of dynamicPowerSharing, the $A\text{-}MPR_c$ determined in accordance with sub-clause 6.2B.3.2 with parameters applicable for UEs not indicating support of dynamicPowerSharing and $MPR_c=0$ dB;

The configured maximum output power $P_{CMAX,c,f}$ for serving cell c=c(2) with frequency f on CG 1 (SCG) is set in accordance with sub-clause 6.2B.4.1.1 but where
- for a UE indicating support of dynamicPowerSharing, $A\text{-}MPR_c=A\text{-}MPR$ with A-MPR determined in accordance with sub-clause 6.2B.3.2 and $MPR_c=0$ dB;
- for a UE not indicating support of dynamicPowerSharing, the $A\text{-}MPR_c$ is determined in accordance with sub-clause 6.2B.3.2 with parameters applicable for UEs not indicating support of dynamicPowerSharing and $MPR_c=0$ dB;

The measured total maximum output power $P_{UMAX}$ over both CGs is $$P_{UMAX}=10 \log_{10}[p_{UMAX,c(1)}+p_{UMAX,c(2)}],$$

where $p_{UMAX,c(j)}$ denotes the measured output power of serving cell c(j) of CG j expressed in linear scale. For UEs indicating support of dynamicPowerSharing in the UE-MRDC-Capability IE $$P_{UMAX} \le MIN\{P_{PowerClass,EN-DC},P_{EMAX,EN-DC}\}+T (MIN\{P_{PowerClass,EN-DC},P_{EMAX,EN-DC}\})$$

while for UEs indicating support of dynamicPowerSharing $$P_{EN-DC,tot\_L}(i_1,i_2)-T(P_{EN-DC,tot\_L}(i_1,i_2)) \le P_{UMAX} \le P_{EN-DC,tot\_H}(i_1,i_2)+T(P_{EN-DC,tot\_H}(i_1,i_2))$$

where the tolerance T(P) for applicable power levels P is specified in Table 6.2B.4.1.1-1.

For UEs of EN-DC power class 2 operating in TDD bands, the UE shall be provided with the higher layer parameter UL-DL-configuration-common and possibly with the higher layer parameter UL-DL-configuration-common-Set2 for a second number of slots and possibly with the parameter UL-DL-configuration-dedicated overriding the flexible symbols per slot over the number of slots as provided by UL-DL-configuration-common or UL-DL-configuration-common-Set2 such that the total duration ofuplink transmissions over any multiple of 20 ms periods is less than 50% of the duration of the said periods or the value indicated by the maxUplinkDutyCycle.

1.1.1.1.3 6.2B.4.1.3 Inter-Band EN-DC within FR1

The following requirements apply for one component carrier per CG. The UE is not configured for operation with shortened TTI and processing time on the MCG [13, TS 36.213]. The CG(s) are indexed by j=1 for MCG and j=2 for SCG.

If the UE is configured with single UL transmission, the configured maximum UE power for sub-frame $i_1$ on GC 1 shall be in accordance with sub-clause 6.2.5 of [36.101] whereas the configured maximum UE power for slot $i_2$ on GC 2 shall be in accordance with sub-clause 6.2.4 of [38.101-1].

For UEs not indicating support of dynamicPowerSharing in the UE-MRDC-Capability IE the total configured output power for both synchronous and non-synchronous operation is $$P_{EN-DC,tot}=10 \log_{10}(\hat{P}_{Total}^{EN-DC})=P_{powerclass,EN-DC}+0.3 \text{ [dBm]}$$

where $P_{powerclass,EN-DC}$ is the EN-DC power class of the band combination configured and $\hat{P}_{Total}^{EN-DC}$ as specified in sub-clause 7.6 of [38.213].

For UEs indicating support of dynamicPowerSharing in the UE-MRDC-Capability IE the UE can configure the total output power within the range $$P_{EN-DC,tot\_L}<P_{EN-DC,tot}<P_{EN-DC,tot\_H}$$

where $$P_{EN-DC,tot\_L}(i_1,i_2)=MIN\{10 \log_{10}(p_{CMAX\_L,MCG}(i_1)+p_{CMAX\_L,SCG}(i_2)),P_{PowerClass,EN-DC},P_{EMAX,EN-DC}\}$$

$$P_{EN-DC,tot\_H}(i_1,i_2)=MIN\{10 \log_{10}(p_{CMAX\_H,MCG}(i_1)+p_{CMAX\_H,SCG}(i_2)),P_{PowerClass,EN-DC},P_{EMAX,EN-DC}\}$$

with $$p_{CMAX\_L,MCG}(i_1)=p_{CMAX\_L,c(1)} \text{ and } p_{CMAX\_L,MCG}(i_2)=p_{CMAX\_L,c(2),f}$$

where $p_{CMAX\_L,c(j)}$ are the lower limits of the configured maximum output powers for cell c(j) of CG j expressed in linear scale and the right-hand sides as specified in clause 6.2.5 in [36.101] for sub-frame $i_1$ and clause 6.2.4 in [38.101-1] for slot $i_2$, while $P_{EMAX,EN-DC}$ is the [P-Max for EN-DC].

The configured maximum output power $P_{CMAX,c}$ for serving cell c=c(1) of CG 1 (MCG) is set in accordance with sub-clause 6.2.5 of [36.101] with the limits replaced by $$P_{CMAX\_L,c}=MIN\{MIN(P_{EMAX,c},P_{LTE})-\Box T_{C,c}, (P_{PowerClass}-\Delta P_{PowerClass})-MAX(MPR_c+A\text{-}MPR_c+\Box T_{IB,c}+\Box T_{C,c}+\Box T_{Prose},P\text{-}MPR_c)\}$$

$$P_{CMAX\_H,c}=MIN\{P_{EMAX,c},P_{LTE},P_{PowerClass}-\Delta P_{PowerClass}\}$$

where $P_{LTE}$ is the value indicated by the IE p-MaxEUTRA-r15 [36.331] in the RRC Connection Reconfiguration when the serving cell c belongs to a cell group configured with EN-DC for a UE supporting EN-DC;

$P_{PowerClass}$ is the maximum UE power on the CG 1 as specified in sub-clause 6.2.2 in [36.101];

the A-MPR$_c$ is determined in accordance with the DCI of serving cell c of the CG 1 and the specification in sub-clause 6.2.4 of [36.101];

The configured maximum output power $P_{CMAX,c,f}$ for serving cell c=c(2) with frequency f on CG 1 (SCG) is set in accordance with sub-clause 6.2.4 of [38.101-1] with the limits replaced by $$P_{CMAX\_L,f,c} = \text{MIN}\{\text{MIN}(P_{EMAX,c}, P_{NR}) - \Delta T_{C,c}, \\ (P_{PowerClass} - \Delta P_{PowerClass}) - \text{MAX}(\text{MPR}_c + A\text{-MPR}_c + A_{IB,c} + \Delta T_{C,c} + \Delta T_{RxSRS}, P\text{-MPR}_c)\}$$

$$P_{CMAX\_H,f,c} = \text{MIN}\{P_{EMAX,c}, P_{NR}, P_{PowerClass} - \Delta P_{PowerClass}\}$$

where $P_{NR}$ is the value given by the IE p-NR in the CellGroupConfig IE [38.331] when the serving cell c belongs to a cell group configured with EN-DC for a UE supporting EN-DC;

$P_{PowerClass}$ is the maximum UE power on the CG 2 as specified in sub-clause 6.2.1 in [38.101-1];

the A-MPR$_c$ is determined in accordance with the DCI of serving cell c of the CG 2 and the specification in sub-clause 6.2.3 of [38.101-1]; The measured total maximum output power $P_{UMAX}$ over both CGs is $$P_{UMAX} = 10 \log_{10}[p_{UMAX,c(1)} + p_{UMAX,c(2)}],$$

where $p_{UMAX,c(j)}$ denotes the measured output power of serving cell c) of CG j expressed in linear scale. For UEs indicating support of dynamicPowerSharing in the UE-MRDC-Capability IE $$P_{UMAX} \leq \text{MIN}\{P_{PowerClass,EN-DC}, P_{EMAX,EN-DC}\} + T(\text{MIN}\{P_{PowerClass,EN-DC}, P_{EMAX,EN-DC}\})$$

while for UEs indicating support of dynamicPowerSharing $$P_{EN-DC,tot\_L}(i_1, i_2) - T_{low}(P_{EN-DC,tot\_L}(i_1, i_2)) \leq P_{UMAX} \leq P_{EN-DC,tot\_H}(i_1, i_2) + T_{high}(P_{EN-DC,tot\_H}(i_1, i_2))$$

where the tolerance T(P) for applicable power levels P is specified in Table 6.2B.4.1.3-1. The evaluation of the $P_{EN-DC,tot\_L}$ ($i_1$, $i_2$) and $P_{EN-DC,tot\_L}$ ($i_1$, $i_2$)) in sub-frame $i_1$ and slot $i_2$ is TBD.

TABLE 6.2B.4.1.3-1

Configured maximum output power tolerance for inter-band EN-DC

| P (dBm) | Tolerance $T_{low}(P)$ (dB) | Tolerance $T_{high}(P)$ (dB) |
|---|---|---|
| 23 < P ≤ 33 | TBD | TBD |
| 21 ≤ P ≤ 23 | TBD | TBD |
| 20 ≤ P < 21 | TBD | TBD |
| 19 ≤ P < 20 | TBD | TBD |
| 18 ≤ P < 19 | TBD | TBD |
| 13 ≤ P < 18 | TBD | TBD |
| 8 ≤ P < 13 | TBD | TBD |
| −40 ≤ P < 8 | TBD | TBD |

1.1.1.1.4 6.2B.4.1.4 Inter-Band EN-DC Including FR2

<Equations for Pcmax>

[The configured maximum output power on the MCG and SCG is in accordance with [36.101] and [38.101-2], respectively.]

Some embodiments of the present disclosure may include one or more of the following:

Embodiment A1. A network node configured to communicate with a wireless device (WD), the network node configured to, and/or comprising a radio interface and/or comprising processing circuitry configured to:

receive a first power headroom report (PHR) for a first RAT from the WD, the first PHR determined based on a transmission on the first RAT and without being based on a transmission on the second RAT; and receive a second power headroom report (PHR) for a second RAT from the WD, the second PHR determined based on both the transmission on the first RAT and the transmission on the second RAT.

Embodiment A2. The network node of Embodiment A1, wherein the first RAT is different from the second RAT.

Embodiment A3. The network node of any one of Embodiments A1 and A2, wherein the processing circuitry is further configured to use the first PHR and the second PHR to configure communications with the WD.

Embodiment B1. A method implemented in a network node, the method comprising:

receiving a first power headroom report (PHR) for a first RAT from the WD, the first PHR determined based on a transmission on the first RAT and without being based on a transmission on the second RAT; and receiving a second power headroom report (PHR) for a second RAT from the WD, the second PHR determined based on both the transmission on the first RAT and the transmission on the second RAT.

Embodiment B2. The method of Embodiment B1, wherein the first RAT is different from the second RAT.

Embodiment B3. The method of any one of Embodiments B1 and B2, further comprising using the first PHR and the second PHR to configure communications with the WD.

Embodiment C1. A wireless device (WD) configured to communicate with a network node, the WD configured to, and/or comprising a radio interface and/or processing circuitry configured to:

provide dual-connectivity to at least different radio access technologies (RATs), the at least two different RATs including at least a first RAT and a second RAT;

determine a first power headroom report (PHR) for the first RAT based on a transmission on the first RAT and without being based on a transmission on the second RAT; and determine a second PHR for the second RAT based on both the transmission on the first RAT and the transmission on the second RAT.

Embodiment C2. The WD of Embodiment C1, wherein the processing circuitry is configured to determine a maximum transmit power value for the first PHR for the first RAT using at least one of a power class value of the WD, a maximum allowed power value for the first RAT, and at least one of a maximum power reduction value for the first RAT and a backoff value for the first RAT.

Embodiment C3. The WD of Embodiment C1, wherein the processing circuitry is configured to determine a maximum transmit power value for the second PHR for the second RAT based at least in part on the transmission on the first RAT.

Embodiment C4. The WD of Embodiment C1, wherein the processing circuitry is configured to determine a maximum transmit power value for the second PHR for the second RAT using at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

Embodiment C5. The WD of any one of Embodiments C1-C4, wherein the processing circuitry is further configured to determine a total power limit for both the transmission on the first RAT and the transmission on the second RAT.

Embodiment C6. The WD of any one of Embodiments C1-C5, wherein the processing circuitry is further configured to:
determine whether the transmission on the first RAT and the transmission on the second RAT are simultaneous;
if the transmission on the first RAT and the transmission on the second RAT are simultaneous, determine a first total power limit value based on a power class value of the WD and an additional maximum power reduction (A-MPR); and
if the transmission on the first RAT and the transmission on the second RAT are not simultaneous, determine a second total power limit value based on a power class value of the WD.

Embodiment C7. The WD of any one of Embodiments C1-C6, wherein the processing circuitry is further configured to:
determine whether a total transmission power of the WD on the first RAT and the second RAT exceeds a total power limit; and
if the total transmission power of the WD exceeds the total power limit, reduce a transmission power of the WD on the second RAT to a value that reduces the total transmission power of the WD to most meet the total power limit.

Embodiment C8. The WD of any one of Embodiments C1-C7, wherein the processing circuitry is further configured to:
communicate the determined first power headroom report (PHR) for the first RAT to the network node; and
communicate the determined second power headroom report (PHR) for the second RAT to the network node.

Embodiment D1. A method implemented in a wireless device (WD), the method comprising:
providing dual-connectivity to at least different radio access technologies (RATs), the at least two different RATs including at least a first RAT and a second RAT;
determining a first power headroom report (PHR) for the first RAT based on a transmission on the first RAT and without being based on a transmission on the second RAT; and
determining a second PHR for the second RAT based on both the transmission on the first RAT and the transmission on the second RAT.

Embodiment D2. The method of Embodiment D1, further comprising determining a maximum transmit power value for the first PHR for the first RAT using at least one of a power class value of the WD, a maximum allowed power value for the first RAT, and at least one of a maximum power reduction value for the first RAT and a backoff value for the first RAT.

Embodiment D3. The method of Embodiment D1, further comprising determining a maximum transmit power value for the second PHR for the second RAT based at least in part on the transmission on the first RAT.

Embodiment D4. The method of Embodiment D1, further comprising determining a maximum transmit power value for the second PHR for the second RAT using at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

Embodiment D5. The method of any one of Embodiments D1-D4, further comprising determining a total power limit for both the transmission on the first RAT and the transmission on the second RAT.

Embodiment D6. The method of any one of Embodiments D1-D5, further comprising:
determining whether the transmission on the first RAT and the transmission on the second RAT are simultaneous;
if the transmission on the first RAT and the transmission on the second RAT are simultaneous, determining a first total power limit value based on a power class value of the WD and an additional maximum power reduction (A-MPR); and
if the transmission on the first RAT and the transmission on the second RAT are not simultaneous, determining a second total power limit value based on a power class value of the WD.

Embodiment D7. The method of any one of Embodiments D1-D6, further comprising:
determining whether a total transmission power of the WD on the first RAT and the second RAT exceeds a total power limit; and
if the total transmission power of the WD exceeds the total power limit, reducing a transmission power of the WD on the second RAT to a value that reduces the total transmission power of the WD to most meet the total power limit.

Embodiment D8. The method of any one of Embodiments D1-D7, further comprising:
communicating the determined first power headroom report (PHR) for the first RAT to the network node; and
communicating the determined second power headroom report (PHR) for the second RAT to the network node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

CDM Code Division Multiplex
CQI Channel Quality Information
CRC Cyclic Redundancy Check
CSI-RS Channel State Information Reference Signal
DC Dual-connectivity
DCI Downlink Control Information
DFT Discrete Fourier Transform
DM-RS Demodulation Reference Signal
EIRP Effective Isotropic Radiated Power
FDM Frequency Division Multiplex
HARQ Hybrid Automatic Repeat Request
OFDM Orthogonal Frequency Division Multiplex
PAPR Peak to Average Power Ratio
PUCCH Physical Uplink Control Channel
PUSCH Physical Uplink Shared Channel
PRACH Physical Random Access Channel
PBCH Primary Broadcast Channel
PRB Physical Resource Block
RRC Radio Resource Control
SRS Sounding Reference Signal
SS-block Synchronization Signal Block
UCI Uplink Control Information It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:
    operating in dual-connectivity with at least two different radio access technologies, RATs, the at least two different RATs including at least a first RAT and a second RAT;
    determining a first power headroom report, PHR, for the first RAT based at least in part on a WD transmission using the first RAT;
    determining a second PHR for the second RAT based at least in part on both the WD transmission using the first RAT and the WD transmission using the second RAT;
    transmitting based on a received allocation information, the allocation information based at least in part on at least one of the determined first PHR and the determined second PHR;
    determining whether a total transmission power of the WD using the first RAT and the second RAT exceeds a total power limit; and
    if the total transmission power of the WD exceeds the total power limit, reducing a transmission power of the WD on the second RAT to a value that reduces the total transmission power of the WD to meet the total power limit.

2. The method of claim 1, wherein the determining the first PHR for the first RAT based at least in part on the WD transmission using the first RAT further includes determining the first PHR for the first RAT independent of the WD transmission using the second RAT.

3. The method of claim 1, further comprising:
    determining a maximum transmit power value for the first PHR for the first RAT using at least one of a power class value of the WD, a maximum allowed power value for the first RAT, and at least one of a maximum power reduction value for the first RAT and a backoff value for the first RAT.

4. The method of claim 1, further comprising:
determining a maximum transmit power value for the second PHR for the second RAT based at least in part on the WD transmission using the first RAT.

5. The method of claim 1, further comprising:
determining a maximum transmit power value for the second PHR for the second RAT using at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

6. The method of claim 1, further comprising:
determining a total power limit for both the WD transmission using the first RAT and the WD transmission using the second RAT.

7. The method of claim 1, further comprising:
determining whether the WD transmission using the first RAT and the WD transmission using the second RAT are simultaneous;
if the WD transmission using the first RAT and the WD transmission using the second RAT are simultaneous, determining a first total power limit value based at least in part on a power class value of the WD and an additional maximum power reduction, A-MPR; and
if the WD transmission using the first RAT and the WD transmission using the second RAT are not simultaneous, determining a second total power limit value based at least in part on a power class value of the WD.

8. The method of claim 1, further comprising:
communicating the determined first PHR for the first RAT; and
communicating the determined second PHR for the second RAT.

9. The method of claim 1, wherein the first RAT is Long Term Evolution, LTE, and the second RAT is New Radio, NR.

10. The method of claim 9, wherein:
determining the PHR for the first RAT further comprises, while operating in the dual-connectivity, calculating the PHR for LTE independent of NR-side WD transmissions; and
determining the PHR for the second RAT further comprises, while operating in the dual-connectivity, calculating the PHR for NR based at least in part on LTE-side WD transmissions.

11. A method implemented in a network node, the method comprising:
receiving at least one of:
a first power headroom report, PHR, for a first radio access technology, RAT, from a wireless device, WD, the first PHR being determined based at least in part on a WD transmission using the first RAT; and
a second power headroom report, PHR, for a second RAT from the WD, the second PHR being determined based at least in part on both the WD transmission using the first RAT and the WD transmission using the second RAT;
transmitting allocation information, the allocation information based at least in part on the received at least one of the first PHR and the second PHR; and receiving, from the WD, a transmission at one of a first total power limit value and a second total power limit value, which one of the first and second total power limit value based at least in part on whether the WD transmission using the first RAT and the WD transmission using the second RAT are simultaneous.

12. The method of claim 11, wherein the first PHR for the first RAT is determined independent of the WD transmission using the second RAT.

13. The method of claim 11, wherein the first PHR for the first RAT is based at least in part on a maximum transmit power value, the maximum transmit power value based at least in part on at least one of a power class value of the WD, a maximum allowed power value for the first RAT, and at least one of a maximum power reduction value for the first RAT and a backoff value for the first RAT.

14. The method of claim 11, wherein the second PHR for the second RAT is based at least in part on a maximum transmit power value, the maximum transmit power value based at least in part on the WD transmission using the first RAT.

15. The method of claim 11, wherein the second PHR for the second RAT is based at least in part on a maximum transmit power value, the maximum transmit power value based at least in part at least one of a power class value of the WD, a maximum allowed power value for the second RAT, and at least one of a maximum power reduction value for the second RAT, a backoff value for the second RAT, a maximum transmit power value for the first RAT, a maximum power reduction value for the first RAT and a backoff value for the first RAT.

16. The method of claim 11, wherein the first RAT is Long Term Evolution, LTE, and the second RAT is New Radio, NR.

17. A wireless device, WD, configured to communicate with a network node, the WD comprising processing circuitry, the processing circuitry being configured to cause the WD to:
operate in dual-connectivity with at least two different radio access technologies, RATs, the at least two different RATs including at least a first RAT and a second RAT;
determine a first power headroom report, PHR, for the first RAT based at least in part on a WD transmission using the first RAT;
determine a second PHR for the second RAT based at least in part on both the WD transmission using the first RAT and the WD transmission using the second RAT;
transmit based on a received allocation information, the allocation information based at least in part on at least one of the determined first PHR and the determined second PHR;
determine whether a total transmission power of the WD using the first RAT and the second RAT exceeds a total power limit; and
if the total transmission power of the WD exceeds the total power limit, reduce a transmission power of the WD on the second RAT to a value that reduces the total transmission power of the WD to meet the total power limit.

18. A network node configured to communicate with a wireless device, WD, the network node comprising processing circuitry, the processing circuitry configured to cause the network node to:
receive at least one of:
a first power headroom report, PHR, for a first radio access technology, RAT, from the WD, the first PHR being determined based at least in part on a WD transmission using the first RAT; and a second power headroom report, PHR, for a second RAT from the WD, the second PHR being determined based at least in part on both the WD transmission using the first RAT and the WD transmission using the second RAT;

transmit allocation information, the allocation information based at least in part on the received at least one of the first PHR and the second PHR; and receive, from the WD, a transmission at one of a first total power limit value and a second total power limit value, which one of the first and second total power limit value based at least in part on whether the WD transmission using the first RAT and the WD transmission using the second RAT are simultaneous.

* * * * *